United States Patent
Vaknin et al.

(10) Patent No.: US 12,461,792 B2
(45) Date of Patent: *Nov. 4, 2025

(54) COMPUTING CLUSTER BRING-UP ON PUBLIC CLOUD INFRASTRUCTURE USING EXPRESSED INTENTS

(71) Applicant: Nutanix, Inc., San Jose, CA (US)

(72) Inventors: Shlomo Shlomi Vaknin, San Jose, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,095

(22) Filed: Jan. 10, 2024

(65) Prior Publication Data

US 2024/0311206 A1    Sep. 19, 2024

Related U.S. Application Data

(63) Continuation of application No. 17/815,949, filed on Jul. 29, 2022, now Pat. No. 11,900,172.

(Continued)

(51) Int. Cl.
*G06F 9/50* (2006.01)
*G06F 9/54* (2006.01)

(52) U.S. Cl.
CPC ............ *G06F 9/5072* (2013.01); *G06F 9/547* (2013.01); *G06F 2209/505* (2013.01)

(58) Field of Classification Search
CPC .................. G06F 9/5072; G06F 9/547; G06F 2209/505

(Continued)

(56) References Cited

U.S. PATENT DOCUMENTS 7,386,697 B1    6/2008    Case et al.
7,412,479 B2    8/2008    Arendt et al.
(Continued)

FOREIGN PATENT DOCUMENTS

EP    4124953 A2    2/2023
KR    101998564 B1    7/2019

OTHER PUBLICATIONS

Non-Final Office Action for U.S. Appl. No. 17/086,405 dated Feb. 3, 2022.
(Continued)

*Primary Examiner* — Wing F Chan
*Assistant Examiner* — Leon Y Tseng
(74) *Attorney, Agent, or Firm* — Vista IP Law Group, LLP

(57) ABSTRACT

Methods, systems and computer program products for bringing-up a computing cluster on a public cloud infrastructure with techniques utilizing expressed intents (high level descriptions of desired configuration) and asynchronously receiving configuration status messages from the public cloud infrastructure. The method includes a cloud management computing system transmitting to the public cloud infrastructure a first expressed intent for bringing-up a computing cluster. The cloud management computing system asynchronously receiving periodic status messages comprising cluster status data from the public cloud infrastructure reflecting a current configuration state of the computing cluster. The system determines, based on the cluster status data, whether the first expressed intent for the computing cluster has been achieved.

20 Claims, 13 Drawing Sheets

Related U.S. Application Data

(60) Provisional application No. 63/203,788, filed on Jul. 30, 2021.

(58) Field of Classification Search
    USPC ........................................................ 709/203
    See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,189,355 | B1 | 11/2015 | Moturu et al. |
| 9,225,707 | B1 | 12/2015 | De Sousa et al. |
| 9,772,866 | B1 | 9/2017 | Aron et al. |
| 10,474,501 | B2 | 11/2019 | Ghodsi et al. |
| 10,778,597 | B1 | 9/2020 | Tan et al. |
| 10,841,152 | B1 | 11/2020 | Humphreys |
| 11,836,535 | B1 | 12/2023 | Allen et al. |
| 2009/0113034 | A1 | 4/2009 | Krishnappa et al. |
| 2011/0055385 | A1 | 3/2011 | Tung et al. |
| 2011/0289343 | A1 | 11/2011 | Schaefer et al. |
| 2013/0159380 | A1 | 6/2013 | Alam et al. |
| 2013/0205028 | A1 | 8/2013 | Crockett et al. |
| 2013/0339949 | A1 | 12/2013 | Spiers et al. |
| 2014/0149590 | A1 | 5/2014 | Mallipeddi et al. |
| 2014/0304352 | A1 | 10/2014 | Chaudhary et al. |
| 2015/0236978 | A1 | 8/2015 | Gulati et al. |
| 2016/0070597 | A1 | 3/2016 | Riggin et al. |
| 2017/0090825 | A1* | 3/2017 | Osadchyy ............. G06F 3/1286 |
| 2017/0139736 | A1 | 5/2017 | Messerli et al. |
| 2017/0223117 | A1 | 8/2017 | Messerli et al. |
| 2017/0339008 | A1 | 11/2017 | Dion et al. |
| 2019/0102411 | A1 | 4/2019 | Hung et al. |
| 2019/0190778 | A1* | 6/2019 | Easterling ............... H04L 67/34 |
| 2019/0238656 | A1 | 8/2019 | Samprathi et al. |
| 2019/0281112 | A1 | 9/2019 | Bhat et al. |
| 2019/0349424 | A1 | 11/2019 | Reddy et al. |
| 2020/0026625 | A1 | 1/2020 | Konka et al. |
| 2020/0028901 | A1 | 1/2020 | Suresh et al. |
| 2020/0084106 | A1 | 3/2020 | Johnson et al. |
| 2020/0084110 | A1 | 3/2020 | Kim et al. |
| 2020/0092222 | A1 | 3/2020 | Mcclenahan et al. |
| 2020/0133738 | A1 | 4/2020 | Junior |
| 2020/0137162 | A1 | 4/2020 | Padmanabh et al. |
| 2020/0244527 | A1 | 7/2020 | Sharma et al. |
| 2020/0314006 | A1 | 10/2020 | Mackie et al. |
| 2020/0349015 | A1 | 11/2020 | Chang et al. |
| 2021/0124624 | A1 | 4/2021 | Jeong |
| 2021/0397465 | A1 | 12/2021 | Mellquist et al. |
| 2021/0397466 | A1 | 12/2021 | Mckee et al. |
| 2022/0138014 | A1 | 5/2022 | Maturi et al. |
| 2022/0155759 | A1 | 5/2022 | Okamoto et al. |
| 2022/0210147 | A1 | 6/2022 | Galvin et al. |
| 2022/0247625 | A1 | 8/2022 | Grimes et al. |
| 2022/0286350 | A1 | 9/2022 | Prabhakar et al. |
| 2022/0308777 | A1 | 9/2022 | Capelo et al. |
| 2023/0025529 | A1* | 1/2023 | Fu ......................... G06F 9/4406 |
| 2023/0028934 | A1 | 1/2023 | Shetty et al. |
| 2023/0385126 | A1 | 11/2023 | Thakkar et al. |

OTHER PUBLICATIONS

Notice of Allowance for U.S. Appl. No. 17/086,405 dated May 27, 2022.

Zagorsek, Hugo, Anja Cotic Svetina, and Marko Jaklic. "Leadership in Clusters: Attributes of Effective Cluster Leader in Slovenia." Transformations in business & economics 7.2 (2008). (Year: 2008).

Addison, L., "Cluster API: Past, Present and Future", Jetstack Ltd., (Jan. 7, 2020).

Micro Focus, "Open Enterprise Server 2018 SP2: OES Cluster Services for Linux", Administration Guide, Micro Focus, (May 2020).

Red Hat, "Red Hat Enterprise Linux CoreOS (RHCOS)", Red Hat, Inc., (Jun. 21, 2020), (Publication date based on indicated capture date by Archive.org; first publication date unknown).

"Cloudbreak 2.4.0 Introduction," Cloudera, URL: https://docs.cloudera.com/HDPDocuments/Cloudbreak/Cloudbreak-2.4.0/content/index.html , downloaded on May 11, 2022.

"Cloudbreak Architecture," Cloudera, URL: https://docs.cloudera.com/HDPDocuments/Cloudbreak/Cloudbreak-2.4.0/content/architecture/index.html, date found via Internet Archive as Sep. 21, 2021.

"Cloudbreak Security Overview," Cloudera, URL: https://docs.cloudera.com/HDPDocuments/Cloudbreak/Cloudbreak-2.4.0/content/security/index.html#identity-management, date found via Internet Archive as Sep. 21, 2021.

"Creating Your First Streams Messaging Cluster in CDP Public Cloud, " Cloudera, URL: https://docs.cloudera.com/cdf-datahub/7.2.10/quick-start-sm/topics/cdf-datahub-sm-cluster-quick-start-createcluster.html?, dated Jun. 14, 2021.

Chemitiganti, V., "Kubernetes in the Enterprise—Chapter 7: What You Need to Know About Platform9 Managed Kubernetes," Platform9, URL: https://platform9.com/blog/kubernetes-in-the-enterprise-chapter-7-what-you-need-to-know-about-platform9-managed-kubernetes/, dated Jun. 9, 2021.

Nimje, S., "How to Set Up a Shared Kubernetes Cluster on AWS using Platform9 Managed Kubernetes," Platform9, URL: https://platform9.com/blog/how-to-set-up-a-shared-kubernetes-cluster-on-aws/, dated Jun. 9, 2021.

"AWS Cloud Provider Management," Platform9, URL: https://platform9.com/docs/v5.1/kubernetes/add-aws-cloud-provider, downloaded on May 11, 2022.

"Red Hat Advanced Cluster Management for Kubernetes," URL: https://www.redhat.com/en/technologies/management/advanced-cluster-management, date found via Internet Archive as Aug. 20, 2020.

"Chapter 1. Managing Your Clusters, " Red Hat, URL: https://access.redhat.com/documentation/en-us/red_hat_advanced_cluster_management_for_kubernetes/2.4/html/clusters/managing-your-clusters, date found via Google as Mar. 19, 2020.

"Chapter 4. Installing on AWS," Red Hat, URL: https://access.redhat.com/documentation/en-us/openshift_container_platform/4.9/html/installing/installing-on-aws, date found via Google as May 15, 2022.

"Chapter 5. Installing on Azure," Red Hat, URL: https://access.redhat.com/documentation/en-us/openshift_container_platform/4.9/html/installing/installing-on-azure, date found via Google as May 15, 2022.

"Chapter 7. Installing on GCP," Red Hat, URL: https://access.redhat.com/documentation/en-us/openshift_container_platform/4.9/html/installing/installing-on-gcp, date found via Internet Archive as Mar. 13, 2022.

"Chapter 7. Creating a cluster," Red Hat, URL: https://access.redhat.com/documentation/en-us/red_hat_advanced_cluster_management_for_kubernetes/2.1/html/manage_cluster/creating-a-cluster, downloaded on May 11, 2022.

"Red Hat Advanced Cluster Management for Kubernetes (RHACM)," YouTube Video, Uploaded on Dec. 4, 2021, URL: https://www.youtube.com/watch?v=58Z91cBiNxE.

"Amazon EKS Anywhere: Create and operate Kubernetes clusters on your own infrastructure," AWS, URL: https://aws.amazon.com/eks/eks-anywhere/?msclkid=7012118bcf5711ec97f70635e15def61, date found via Google as Dec. 21, 2020.

"Granting access to a user to view Kubernetes resources on a cluster," AWS, URL: https://docs.aws.amazon.com/eks/latest/userguide/connector-grant-access.html, date found via Google as Sep. 7, 2021.

"Install EKS Anywhere," Amazon AWS, URL: https://anywhere.eks.amazonaws.com/docs/getting-started/install/, date found via Google as Sep. 8, 2021.

"Cluster creation workflow," Amazon AWS, URL: https://anywhere.eks.amazonaws.com/docs/concepts/clusterworkflow/, date found via Google as Sep. 8, 2021.

(56) References Cited

OTHER PUBLICATIONS

"AuthN / AuthZ," Amazon AWS, URL: https://anywhere.eks.amazonaws.com/docs/reference/faq/#authn--authz, downloaded on May 11, 2022.
"Anthos technical overview," Google Cloud, URL: https://cloud.google.com/anthos/docs/concepts/overview, date found via Internet Archive as Sep. 16, 2020.
"Anthos clusters on AWS documentation," Google Cloud, URL: https://cloud.google.com/anthos/clusters/docs/multi-cloud/aws, date found via Internet Archive as Mar. 18, 2022.
"Deploy an application on Anthos clusters on Azure," Google Cloud, URL: https://cloud.google.com/anthos/clusters/docs/multi-cloud/azure/deploy-app, downloaded on May 11, 2022.
"Create a Cluster," Oracle Help Center, URL: https://docs.oracle.com/en/cloud/paas/big-data-compute-cloud/csspc/create-cluster.html, date found via Google as Jan. 18, 2019.
"Bringing Up Clusters in the WebUI or CLI," COMMVAULT, URL: https://documentation.commvault.com/cds/121157_bringing_up_clusters_in_webui_or_cli.html, dated Jan. 7, 2022.
"What is cloud management?," Red Hat, URL: https://www.redhat.com/en/topics/cloud-computing/what-is-cloud-management, dated Mar. 7, 2018.
"Observability: Red Hat Advanced Cluster Management for Kubernetes 2.3," Red Hat, URL: https://access.redhat.com/documentation/en-us/red_hat_advanced_cluster_management_for_kubernetes/2.3/html-single/observability/index, date found via Google as Aug. 9, 2021.
"Support: Openshift Container Platform 4.8," Red Hat, URL: https://access.redhat.com/documentation/en-us/openshift_container_platform/4.8/html-single/support/index#about-remote-health-monitoring, downloaded on May 12, 2022.
"What is Amazon EKS?," AWS, URL: https://docs.aws.amazon.com/eks/latest/userguide/what-is-eks.html, date found via Internet Archive as Mar. 3, 2022.
"Amazon EKS nodes," AWS, URL: https://docs.aws.amazon.com/eks/latest/userguide/eks-compute.html, date found via Internet Archive as Jun. 6, 2022.
"Monitor metrics with CloudWatch," AWS, URL: https://docs.aws.amazon.com/emr/latest/ManagementGuide/UsingEMR_ViewingMetrics.html, date found via Internet Archive as Mar. 25, 2022.
"Managing and Monitoring Clusters," Cloudbreak, URL: https://docs.cloudera.com/HDPDocuments/Cloudbreak/Cloudbreak-2.4.2/content/os-clusters-manage/index.html, date found via Google as Aug. 12, 2019.
"Features," Kubesphere, URL: https://kubesphere.io/docs/v3.3/introduction/features/, dated Nov. 2, 2021.
"Kubernetes Multi-Cluster Management—Overview," Kubesphere, URL: https://kubesphere.io/docs/v3.3/multicluster-management/introduction/overview/, dated Apr. 14, 2021.
"Cluster Status Monitoring," Kubesphere, URL: https://kubesphere.io/docs/v3.3/cluster-administration/cluster-status-monitoring/, dated Nov. 2, 2021.
"PMK Product Overview," Platform9, URL: https://platform9.com/docs/v5.1/kubernetes/introduction-overview#24x7-live-monitoring-and-management-of-your-kubernetes-clusters, downloaded on May 12, 2022.
"Enable In-Cluster Monitoring," Platform9, URL: https://platform9.com/docs/kubernetes/enabling-in-cluster-monitoring, dated Apr. 1, 2022.
"What is Azure Arc-enabled Kubernetes?," Microsoft Docs, URL: https://docs.microsoft.com/en-us/azure/azure-arc/kubernetes/overview, dated May 4, 2022.
"Azure Monitor overview," Microsoft Docs, URL: https://docs.microsoft.com/en-us/azure/azure-monitor/overview, dated Jul. 29, 2022.
"Azure Arc hybrid management and deployment for Kubernetes clusters," Microsoft Docs, URL: https://docs.microsoft.com/en-us/azure/architecture/hybrid/arc-hybrid-kubernetes, date found via Internet Archive as Feb. 8, 2022.
"What is Dataproc?," Microsoft Docs, URL: https://cloud.google.com/dataproc/docs/concepts/overview, date found via Internet Archive as Mar. 2, 2022.
"Cluster web interfaces," Google Cloud, https://cloud.google.com/dataproc/docs/concepts/accessing/cluster-web-interfaces, date found via Internet Archive as Aug. 2, 2021.
"Class Cluster," Google.Apis, URL: https://googleapis.dev/dotnet/Google.Apis.Dataproc.v1/latest/api/Google.Apis.Dataproc.v1.Data.Cluster.html, date found via Google as May 2019.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
Notice of Allowance for U.S. Appl. No. 17/086,405 dated Sep. 8, 2022.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Partial European Search Report for EP Patent Appln. No. 22187971.1 dated Nov. 23, 2022.
Hortonworks Inc. : "Cloudbreak 2.4.0 documentation" , Dec. 31, 2018 (Dec. 31, 2018), XP05598~383, Retriteved from the Internet: URL:https://docs.cloudera.com/HDPDocuments /Cloudbreak/Cloudbreak-2.4.0/content/index.html [retrieved on Nov. 15, 2022]• p. 4 •.
Extended European Search Report for EP Patent Appln. No. 22187971.1 dated Feb. 24, 2023.

(56) References Cited

OTHER PUBLICATIONS

Notice of Allowance dated Jul. 31, 2023 for related U.S. Appl. No. 18/152,092.
Notice of Allowance for U.S. Appl. No. 17/815,949 dated Oct. 5, 2023.
Notice of Allowance dated Nov. 15, 2023 for related U.S. Appl. No. 18/152,092.
Non-Final Office Action for U.S. Appl. No. 17/815,794 dated May 8, 2024.
Non-Final Offie Action for U.S. Appl. No. 17/815,794 dated Feb. 4, 2025.
Examination Report for EP Patent Appln. No. 22187971.1 dated Feb. 14, 2025.
Notice of Allowance for U.S. Appl. No. 17/815,794 dated Aug. 4, 2025.

* cited by examiner

COMPUTING CLUSTER BRING-UP ON PUBLIC CLOUD INFRASTRUCTURE USING EXPRESSED INTENTS

RELATED APPLICATIONS

The present application is a continuation of U.S. patent application Ser. No. 17/815,949, titled "COMPUTING CLUSTER BRING-UP ON PUBLIC CLOUD INFRASTRUCTURE USING EXPRESSED INTENTS, filed Jul. 29, 2022, which claims the benefit of priority of U.S. provisional patent application No. 63/203,788, filed Jul. 30, 2021, which is incorporated by reference herein in its entirety.

TECHNICAL FIELD

This disclosure relates to configuring a computing cluster and cloud computing, and more particularly to methods and systems for using expressed intents to bring-up a computing cluster on a public cloud infrastructure.

BACKGROUND

A computing cluster is a set of computers configured to work together as a single system. A computing cluster is generally formed of a plurality of computers (e.g., servers) which are connected to each other through communication network(s) such that each computer forms a node in the computing cluster. Computing clusters may be deployed for various reasons, such as to improve performance, and provide improved backup redundancy and high availability of compute resources, over that of a single computer. At the same time, computing clusters are typically much more cost effective than single computers having comparable speed and availability. Computing clusters may also be utilized to provide hyperconverged computing infrastructure (HCI) deployment in which the computing elements of a conventional "hardware-defined" computing system, including storage, computing, networking, and management are all virtualized on the nodes of a computing cluster. The convergence, interoperability and consolidation of the functional elements are enabled by a hypervisor.

A computing cluster is formed by a process referred to as "bring-up" or "bringing-up" of a plurality of computers to configure the computers to perform the desired computing, storage, networking and management functions as a single computing system. The configuration of the computers and/or the computing cluster may be set forth in a set of specifications for the computers and/or computing cluster. The bring-up process is typically accomplished by some type of cluster management service which performs the needed bring-up operations to provision and configure each of the nodes of the computing cluster to provide the computing, networking and/or storage resources needed for the cluster and to configure or "cluster" the nodes to interoperate as a single computing system.

Public cloud computing infrastructures can be utilized to provide on-demand computing resources which can be utilized to bring-up and operate computing clusters. Public cloud infrastructures allow a user to avoid the up-front infrastructure costs for the computing resources, and can provide more flexible computing and storage capacity than user owned computing infrastructure. Several examples of public cloud infrastructures include Amazon Web Services®, Microsoft Azure®, Google Cloud Services®, and Oracle Cloud®. However, bringing-up a computing cluster on a public cloud infrastructure presents a number of challenges. For one, each public cloud infrastructure utilizes different protocols and interfaces, such that a different cluster management service may be required for each different public cloud infrastructure. Furthermore, communication between an external cluster management service (i.e., external to the public cloud infrastructure) is difficult due to firewalls and other security provisions, and potential networking issues.

Additional challenges and drawbacks of previous methods of bringing-up a computing cluster on a public cloud infrastructure will be described with reference to the schematic block diagram of a previously disclosed system which is depicted in FIG. 1. As shown in FIG. 1, a schematic diagram of a previously disclosed system 10 for bringing-up a computing cluster 14 on any one of a plurality of public cloud infrastructures 12 is shown. In the example of FIG. 1, three different public cloud infrastructures 12 are depicted, including Microsoft Azure 12a (Azure), Google Cloud Platform (GCP) 12b, and Amazon Web Services (AWS) 12c. Additional and/or different public cloud infrastructures 12 may be utilized in the system 10. The system 10 includes a cloud management service (CMS) 16 for bringing-up a computing cluster 14 on any one of the public cloud infrastructures 12. In the example of FIG. 1, the CMS 16 is itself cloud based, and is accessible by a user computing system 18 via a communication network including the internet. For example, the CMS 16 may be provided by a CMS provider, such as VMWare™, which licenses use of the cloud based CMS 16. In other examples, the CMS 16 could be a private computing system accessible by the user computing system 18 via a private communication network and/or the internet. In order to bring-up a computing cluster 14 on one of the public cloud infrastructures 12, a user accesses a user interface 20 of the CMS 16 and requests a computing cluster. The CMS 16 typically allows the user to provide specifications and other configurations for the desired computing cluster. The CMS includes a separate cloud management module 22 for each public cloud infrastructure 12, as each public cloud infrastructure 12 utilizes different application programming interface (API) calls and protocols for bringing-up a computing cluster, such as provisioning nodes, setting up networking, installing virtual machine services, forming a cluster from the nodes (i.e., clustering the provisioned nodes), etc. Accordingly, the CMS 16 has an Azure cloud management module 22a, a GCP cloud management module 22b, and an AWS cloud management module 22c. Each module 22 includes API calls and protocols specific to the respective public cloud management module 22 for which it is designed to bring-up a computing cluster 14.

As illustrated in FIG. 1, the CMS 16 brings-up a computing cluster 12 in an account of the CMS provider, and not an account of the user. In this way, the CMS 16 service provider utilizes the public cloud infrastructures 12 as computing resources for its customers' computing clusters. In other words, in bringing-up a computing cluster 12a on the Azure public cloud infrastructure 12a, the computing cluster 12a is brought up in a CMS account 15a on Azure 12a. Similarly, a computing cluster 12b bring-up on the GCP public cloud infrastructure 12b is brought up in a CMS account 15b on GCP 12b, and a computing cluster 12c on the AWS public cloud infrastructure 12c is brought up in a CMS account 15b on GCP 12c. Hence, the user does not have direct access to the computing cluster 12 on the public cloud infrastructure 12, but is instead only provided use of the computing cluster 12 via an internet portal (i.e., http: or URL) to the computing cluster 14. The user does not have direct access to the native tools and services provided by the public cloud infrastructure. As a result, the user can only utilize services and features provided by the particular public cloud infrastructure 12 if the CMS 16 enables such services and features. For instance, new services and features may be offered by a public cloud infrastructure 12, but there may be a delay before the CMS 16 enables use of such services, or the CMS 16 may not enable them at all.

Moreover, the user cannot control the computing cluster 14 on the public cloud infrastructure 12, and is totally reliant on the provider of the CMS 16. For instance, the user cannot control the costs associated with computing resources provided by the public cloud infrastructure 12. The user may not even know the real-time costs of the resources on the public cloud infrastructure because the computing cluster is in an account of the CMS provider.

The user also does not have direct control of the computing cluster 14 on the public cloud infrastructure 12 regarding the security of its data, the networking configurations of the computing cluster 14, or the ability to use cloud native tools, such as database tools, load balancers, etc. For instance, the user cannot utilize a cloud native load balancer, to direct traffic among virtual machines (nodes) of the computing cluster 14. Similarly, the user cannot use its own load balancer in the user's account on the public cloud infrastructure because the computing cluster 14 in the CMS account 12 and load balancer are in different accounts. In addition, the CMS provider may also have its own cloud computing infrastructure upon which to bring-up computing clusters, but again, the user does not have access to such computing resources except through the CMS 16. The data is also in the CMS account 15 of the public cloud infrastructure 12, such that the user must trust that the CMS provider is properly securing the user's data on the public cloud infrastructure 12.

As another example of the drawbacks of the prior art system 10, bringing-up the computing cluster 14 in the CMS account 15 also prevents a user from utilizing tools and services which interoperate between the computing cluster 14 in the CMS account and a computing cluster formed in an account of the user on the same public cloud infrastructure 12. For instance, the user may use a native cluster management service provided by the public cloud infrastructure 12, or other cluster management service, to bring-up and run a native computing cluster in the user's account on the public cloud infrastructure. Because the native computing cluster and the computing cluster 14 are in different accounts on the public cloud infrastructure 12, the user cannot use tools and services which interoperate with both computing clusters. For example, a load balancer cannot be used to direct traffic between the native computing cluster and the computing cluster 14 in the CMS account.

Another drawback of the prior art system 10 is that the user must utilize the computer security that the CMS provider makes available, such as data security, application security, access security, etc. The user cannot utilize its own computer security, including its own security scripts and other security software that the user's security engineers and architects may have devised and/or licensed. An additional concern is that the user cannot maintain full control of its data on the public cloud infrastructure because the user does not have direct control of the user's data as such data is stored within the CMS provider's account 15 on the public cloud infrastructure 12. This may present additional issues if there are government regulations covering the protection and security of the date are involved. In fact, the user may not be able to comply with the government regulations using the system architecture of the prior art system 10.

Still another drawback of the prior art system 10 is that the user cannot select the public cloud infrastructure 12 that best fits and/or is most compatible with the user's work flow, the user's tools, etc. Instead, the CMS provider determines the public cloud infrastructure 12 on which to bring-up the user's computing cluster 14, and the user is merely provided with a portal to access the computing cluster 14 (e.g., HTML portal), and has no control over the computing cluster 14 except via the CMS 16 provided by the CMS provider. Furthermore, in most cases, the user cannot migrate the user's computing infrastructure from an on-premises system to the public cloud infrastructure 12. Also, in many cases, the prior art system 10 is configured to meet the needs of the lowest common denominator of its users, which may not be the best configuration for each user.

Yet another drawback of the prior art system 10 is that the CMS 16 has separate cloud management modules 22 in which each module 22 is configured for a different respective public cloud infrastructure. In other words, there is a different management module having a different cluster orchestrator for each different public cloud infrastructure. This increases the complexity of the system 10 and requires a different interface between the UI and the cloud management module 22 for each public cloud infrastructure.

Another problem that can occur when bringing a computing cluster on a public cloud infrastructure is caused by the difficulty in communicating between a cluster orchestrator of the CMS on the one hand, which determines and sends bring-up commands and is outside of the public cloud infrastructure, and the public cloud infrastructure on the other hand. The public cloud infrastructure has firewalls and other security measures which can make such communication difficult. In addition, bringing-up a cluster requires many computing and networking resources, and it may take a long while for the bring-up operations to be carried out. Typically, the orchestrator opens network sockets (e.g., remote procedure call sockets, referred to as RPC sockets) and the RPC sockets are kept open during the bring-up process to allow communication between the orchestrator and the public cloud infrastructure through the firewalls and other security of the public cloud infrastructure. However, RPC sockets are known to be relatively unreliable, and during the bring-up and configuration of other networking equipment, there are many potential errors that can occur. As a result, previously known systems are not very fault tolerant against errors frequently seen during cluster bring-up, especially when bringing-up a computing cluster on a public cloud infrastructure using a CMS that is external to the public cloud infrastructure.

Typically, it is also not possible to simply migrate a user's computing cluster(s) from an on-premises system (e.g., a cloud computing platform), and move it into a user's account on a public cloud infrastructure. Because the prior art system 10 brings-up the computing cluster in the CMS provider's account, a user cannot simply migrate an on-premises computing cluster into the public cloud infrastructure because the user does not have direct access to the CMS provider's account on the public cloud infrastructure.

Therefore, methods and systems incorporating a technique or techniques that accomplish computing cluster bring-up on any one of a plurality of different public cloud infrastructures, and provide a user better control of the computing resources and more flexible access to tools and features of the public cloud infrastructure, is needed Also needed are methods and systems having improved communication techniques in bringing-up a computing cluster on a public cloud infrastructure using an external CMS, which are more fault tolerant and overcome the communication issues of legacy systems.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for bringing-up a computing cluster on a public cloud infrastructure, which techniques advance the relevant technologies to address technological issues with legacy approaches. More specifically, the present disclosure describes improved techniques used in systems, methods, and in computer program products for bringing-up a computing cluster on a public cloud infrastructure in which the computing cluster is brought-up using expressed intents by transmitting an expressed intent, and asynchronously receiving configuration status messages from the public cloud infrastructure. This technique is also referred to as a "ping and pong" or "pings and pongs" intent-based protocol because the status messages are like "pings" which are directly responded to with "pongs." Also disclosed herein are improved techniques used in systems, methods, and in computer program products for bringing-up a computing cluster on a public cloud infrastructure in which the computing cluster is brought-up using a multicloud management system which is configured to bring-up a computing cluster on any one of a plurality of different public cloud infrastructures, such as Amazon Web Services®, Microsoft Azure®, Google Cloud Services®, and Oracle Cloud®. In addition, the computing cluster is brought-up in a user's account on the public cloud infrastructure, allowing the user to directly utilize tools and features of the public cloud infrastructure and/or computer security of the user's choice. The present disclosure also describes improved techniques used in systems, methods, and in computer program products for improved communications in bringing-up a computing cluster on a public cloud infrastructure using a cloud management system external to the public cloud infrastructure.

The disclosed embodiments modify and improve over legacy approaches. In particular, the herein-disclosed techniques provide technical solutions that address the technical problems attendant cluster bring-up and/or ongoing cluster management by utilizing a more fault tolerant process, and may also address technical problems with bringing-up and managing a computing cluster on any of a plurality of different public cloud infrastructures, wherein each public cloud infrastructure has different bring-up protocols.

The ordered combination of steps of the embodiments serve in the context of practical applications that perform bring-up of a computing cluster using an ordered combination of steps that improves the reliability of communications between an external cluster management system and a public cloud infrastructure. In other disclosed embodiments, the ordered combination of steps provides practical application the perform bring-up of a computing cluster in a user's account on any one of a plurality of public cloud infrastructures within a user's own account on the respective public cloud infrastructure. As such, the disclosed techniques for performing bring-up of a computing cluster overcome long standing yet heretofore unsolved technological problems associated with operations to bring-up a computing cluster on any one of a plurality of public cloud infrastructures within a user's account, which allows the user improved control and functionality over previously available techniques.

Accordingly, one herein disclosed embodiment is directed to a method for bringing-up a computing cluster on a public cloud infrastructure by transmitting an expressed intent, and receiving configuration status messages from the public cloud infrastructure. The configuration status messages may be received asynchronously to improve the efficiency of the communications. Accordingly, in one embodiment, the method includes a cloud management computing system transmitting to a public cloud infrastructure a first expressed intent for bringing-up a computing cluster on the public cloud infrastructure. The expressed intent comprises a high level description of a desired configuration for the computing cluster (as opposed to detailed bring-up commands such as API calls, etc.).

The cloud management computing system receives periodic status messages from the public cloud infrastructure (e.g., asynchronously). The status messages may be sent from the public cloud infrastructure at a set time interval or upon some other triggering event, but is not prompted by the cloud management computing system. The status messages include cluster status data from the public cloud infrastructure. Each status message reflects a respective current configuration state of the computing cluster. For instance, the status messages may include metadata for one or more node(s) on the public cloud infrastructure on which the computing cluster is being brought-up. The cloud management computing system then determines, based on the cluster status data, whether the first expressed intent for the computing cluster has been achieved.

When the cloud management computing system determines that the first expressed intent has not been achieved, the cloud management computing system re-transmits the first expressed intent to the public cloud infrastructure in direct response to the cluster status message. As a direct response to a cluster status message sent from the public cloud infrastructure, there is an open communication port for the newly transmitted first expressed intent to be transmitted form the cloud management computing system to the public cloud infrastructure (i.e., such transmission will not be blocked by firewalls and/or other security) The cloud management system repeatedly receives asynchronous cluster status messages until the cloud management computing system determines that the first expressed intent has been achieved.

When the cloud management computing system determines that the first expressed intent has been achieved, the cloud management computing system then transmits a second expressed intent for bringing-up a computing cluster on the public cloud infrastructure, different than the first expressed intent, to the public cloud infrastructure.

In another aspect of the ping and pong method, the cloud management computing system includes a multicloud management system configured to bring-up a computing cluster on any one of a plurality of different public cloud infrastructures, wherein each different public cloud infrastructure has different bring-up protocols from the other public cloud infrastructures. This is same or similar to the multicloud management system of embodiments for bringing-up a computing cluster on a public cloud infrastructure in a user's account on the public cloud infrastructure. In another aspect, the plurality of public cloud infrastructures comprises Amazon Web Services®, Microsoft Azure®, Google Cloud Services®, and Oracle Cloud®.

In another aspect, the ping and pong method may further include installing an orchestrator agent on the public cloud infrastructure such that the orchestrator agent and cloud management system define and function as an interface between the cloud management system and the public cloud infrastructure, and the method includes: the orchestrator agent receiving the first expressed intent; and the orchestrator agent dispatching bring-up operations to the public cloud infrastructure for bringing-up the computing cluster to achieve the first expressed intent. In another aspect, the interface between the cloud management system and the public cloud infrastructure for communicating the expressed intents and the status messages is the same regardless of the particular public cloud infrastructure.

In other aspects of the ping and pong method, the bring-up operations consist of only idempotent operations and/or atomic operations.

In additional aspects, the cloud management computing system receives client instructions to configure the computing cluster having a set of specifications. The cloud management computing system then generates the expressed intents based on the set of specifications.

In further aspects of the ping and pong method, the cloud management computing system comprises a cloud computing system. As used herein, the term "cloud computing system" or "cloud computing platform," or the like, means a computing system which is accessed by user(s), and which delivers computing services, over the internet. In yet additional aspects, the ping and pong method further includes: the cloud management computing system invoking an application programming interface (API) on the public cloud infrastructure to obtain an infrastructure status of public cloud infrastructure services; the cloud management computing system receiving public cloud infrastructure services status data in response to invoking the API; and wherein the step of the cloud management computing system determining whether the first expressed intent for the computing cluster has been achieved is also based on the public cloud infrastructure services status data. In another aspect the interface between the cloud management system and the public cloud infrastructure for communicating the expressed intents and the status messages is the same regardless of the particular public cloud infrastructure, and the steps utilize different APIs for each different public cloud infrastructure.

Another disclosed embodiment is directed to a non-transitory computer readable medium having stored thereon a sequence of instructions which, when stored in memory and executed by a processor cause the processor to perform a process according to the ping and pong method for bringing-up a computing cluster on a public cloud infrastructure using expressed intents. Accordingly, in one embodiment, the process includes: (a) transmitting to a public cloud infrastructure a first expressed intent for bringing-up a computing cluster on the public cloud infrastructure, wherein an expressed intent comprises a high level description of a desired configuration for the computing cluster; (b) asynchronously receiving periodic status messages comprising cluster status data from the public cloud infrastructure reflecting a respective current configuration state of the computing cluster; (c) determining, based on the cluster status data, whether the first expressed intent for the computing cluster has been achieved; (d) when determining that the first expressed intent has not been achieved, re-transmitting the first expressed intent to the public cloud infrastructure in direct response to the first status message, and repeatedly receiving asynchronous status data until determining that the first expressed intent has been achieved; (e) when determining that the first expressed intent has been achieved, transmitting a second expressed intent, different than the first expressed intent, to the public cloud infrastructure.

In additional aspects, the non-transitory computer readable medium includes instructions wherein the process includes any one or more of the additional aspects and features of the ping and pong method, as described above.

Still another embodiment described herein is directed to a system for bringing-up a computing cluster on a public cloud infrastructure using the ping and pong method. In one embodiment, the system includes a cloud management computing system comprising a processor and a cluster orchestrator which is executed by the processor. The cloud management computing system is configured to bring-up a computing cluster on a public cloud infrastructure using a process comprising: (a) the cluster orchestrator determining a first expressed intent for bringing-up a computing cluster on the public cloud infrastructure, wherein an expressed intent comprises a high level description of a desired configuration for the computing cluster; (b) the cloud management computing system transmitting to a public cloud infrastructure the first expressed intent; (c) the cluster orchestrator asynchronously receiving periodic status messages comprising cluster status data from the public cloud infrastructure reflecting a current configuration state of the computing cluster; (d) the cluster orchestrator determining, based on the cluster status data, whether the first expressed intent for the computing cluster has been achieved; (e) when the cluster orchestrator determines that the first expressed intent has not been achieved, the cloud management computing system re-transmitting the first expressed intent to the public cloud infrastructure in direct response to the cluster status message, and repeatedly receiving asynchronous cluster status messages until the orchestrator determines that the first expressed intent has been achieved; and (f) when the cluster orchestrator determines that the first expressed intent has been achieved, the cluster orchestrator determining a second expressed intent; and (g) the cloud management system transmitting the second expressed intent to the public cloud infrastructure.

In another aspect of the ping and pong system, the cloud management computing system comprises a multicloud management system configured to bring-up a computing cluster on any one of a plurality of different public cloud infrastructures, wherein each different public cloud infrastructure has different bring-up protocols from the other public cloud infrastructures, same or similar to the multicloud management system described above.

In yet another aspect of the ping and pong system, the plurality of public cloud infrastructures comprises Amazon Web Services®, Microsoft Azure®, Google Cloud Services®, and Oracle Cloud®.

In additional aspects of the ping and pong system, the system may be configured such that process includes any one or more of the additional aspects and features of the ping and pong methods and processes, described above.

BRIEF DESCRIPTION OF THE DRAWINGS

The drawings described below are for illustration purposes only. The drawings are not intended to limit the scope of the present disclosure. Like reference numerals in this specification and the accompanying drawings refer to like elements and the description for like elements shall be applicable for all described embodiments wherever relevant.

DETAILED DESCRIPTION

Aspects of the present disclosure solve problems associated with using computer systems to perform bring-up of a computing cluster on a public cloud infrastructure, such as bring-up of a computing cluster in a user's account on any one of a plurality of different public cloud infrastructure, and/or using expressed intents. The accompanying figures and discussions herein present example environments, systems, methods, and computer program products for bring-up of a computing cluster in a user's account on any one of a plurality of different public cloud infrastructure, and/or using expressed intents and asynchronous status messages.
Virtualized Computer System Architecture Examples All or portions of any of the systems, methods and techniques described below with respect to FIGS. 2-8 can be utilized to bring-up a computing cluster in a virtualized computing environment having a virtualized controller situated therein. Some example instances of virtualized controllers situated within various virtual computing environments are shown and discussed as pertains to FIG. 9A, FIG. 9B, FIG. 9C, and FIG. 9D.

Figure 9A:
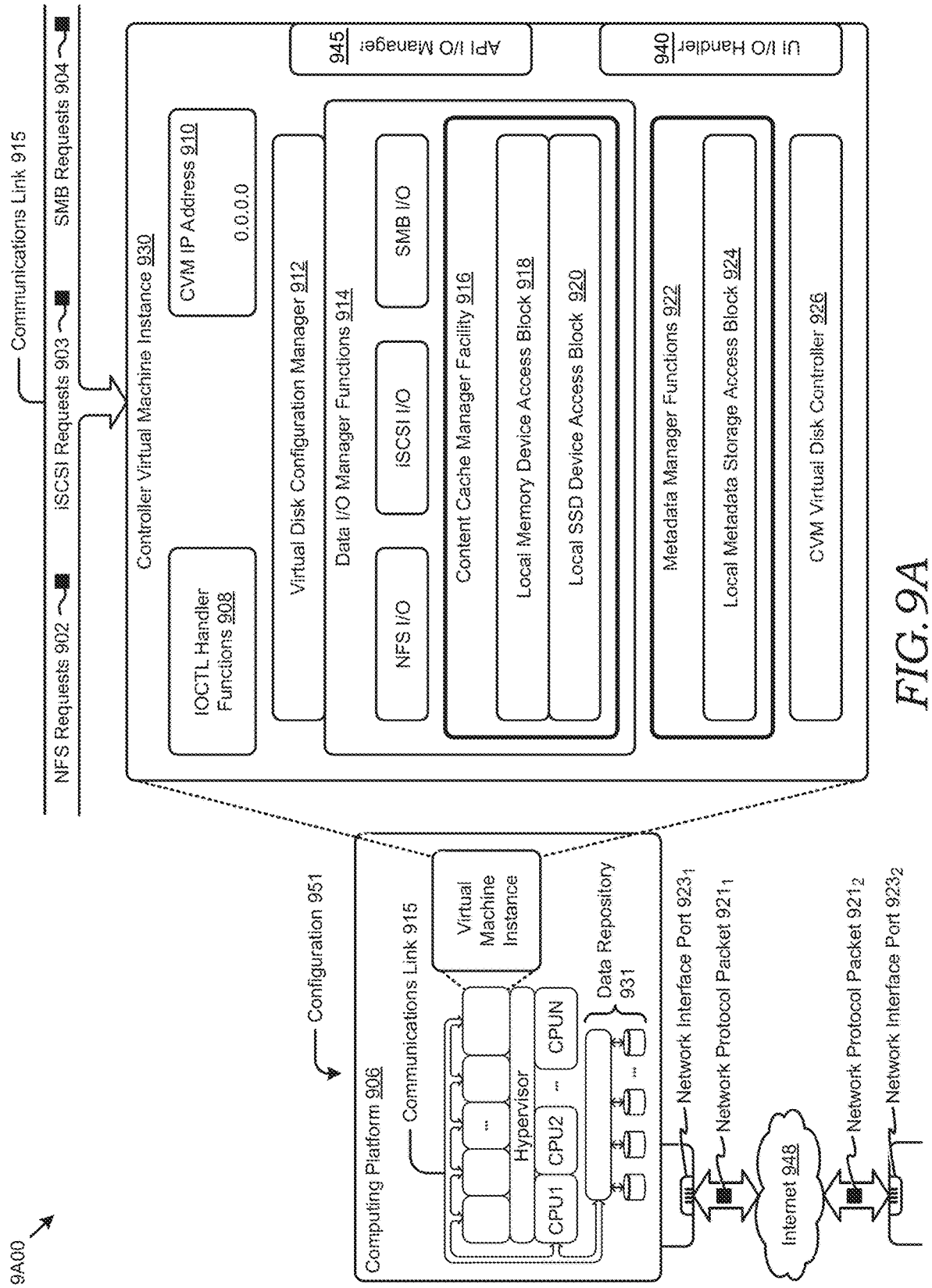
FIG. 9A, FIG. 9B, FIG. 9C, and FIG. 9D depict virtualization system architectures comprising collections of interconnected components suitable for implementing embodiments of the present disclosure and/or for use in the herein-described environments.

FIG. 9A depicts a virtualized controller as implemented in the shown virtual machine architecture 9A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 930.

In this and other configurations, a controller virtual machine instance receives block I/O storage requests as network file system (NFS) requests in the form of NFS requests 902, and/or internet small computer system interface (iSCSI) block input-output requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output can be handled by one or more IO control (IOCTL) handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, ISCSI IO, SMB IO, etc.).

In addition to block IO functions, configuration 951 supports input or output (IO) of any form (e.g., block IO, streaming IO) and/or packet-based IO such as hypertext transport protocol (HTTP) traffic, etc., through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, etc.). Data repository 931 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 924. The data repository 931 can be configured using CVM virtual disk controller 926, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 951 can be coupled by communications link 915 (e.g., backplane, local area network, public switched telephone network, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 9231 and network interface port 9232). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 9211 and network protocol packet 9212).

Computing platform 906 may transmit and receive messages that can be composed of configuration data and/or any other forms of data and/or instructions organized into a data structure (e.g., communications packets). In some cases, the data structure includes program instructions (e.g., application code) communicated through the Internet 948 and/or through any one or more instances of communications link 915. Received program instructions may be processed and/or executed by a CPU as it is received and/or program instructions may be stored in any volatile or non-volatile storage for later execution. Program instructions can be transmitted via an upload (e.g., an upload from an access device over the Internet 948 to computing platform 906). Further, program instructions and/or the results of executing program instructions can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/ or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to performing VM migrations in advance of a failure event to achieve VM placement for high-availability on a non-empty cluster. In some embodiments, a module may include one or more state machines and/or combinational logic used to implement or facilitate the operational and/or performance characteristics pertaining to performing VM migrations in advance of a failure event to achieve VM placement for high-availability on a non-empty cluster.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing VM migrations). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to performing VM migrations to achieve a high-availability VM placement and/or for improving the way data is manipulated for achieving a high availability placement of VMs before occurrence of a failure event.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 9B:
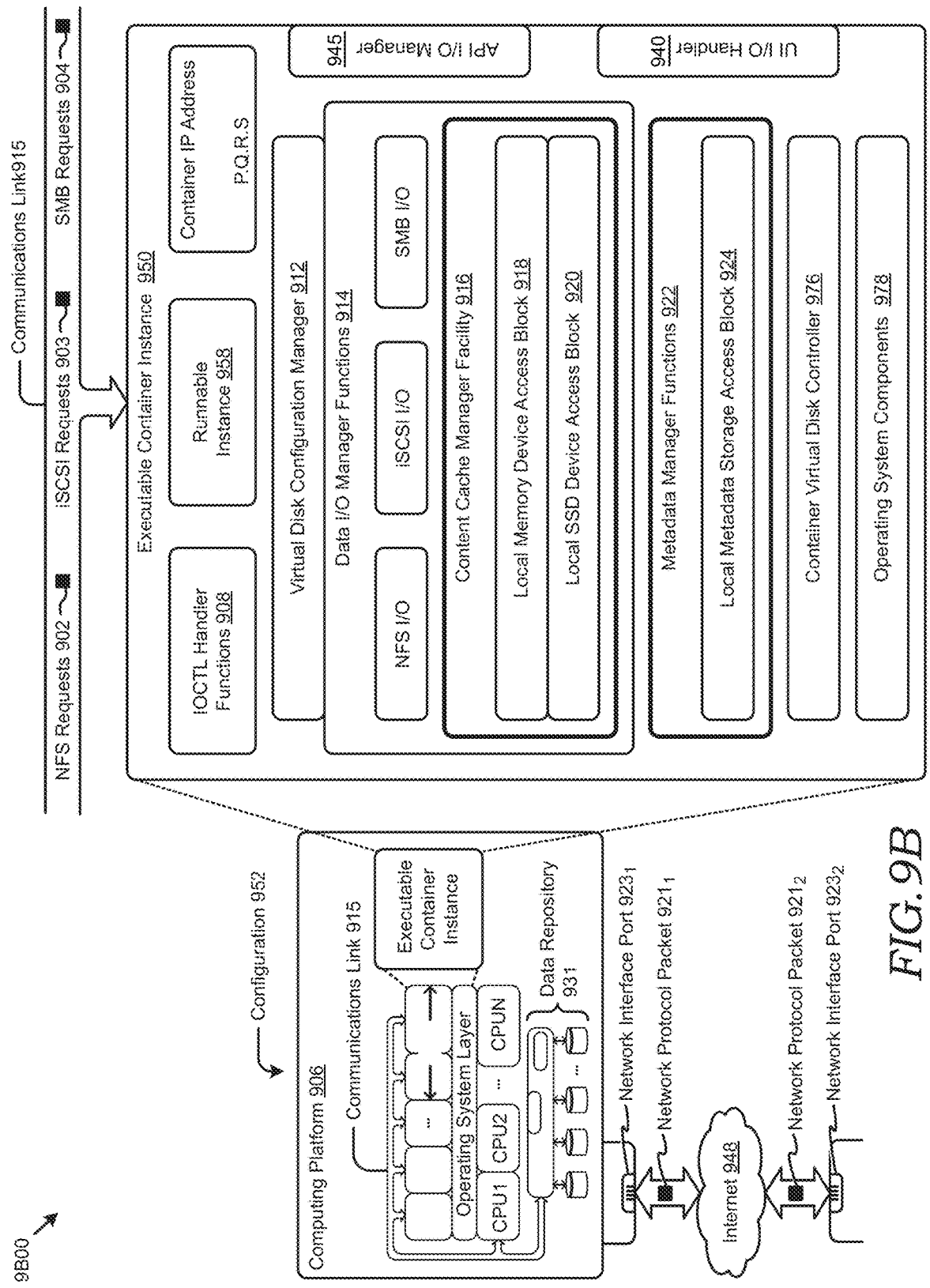

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
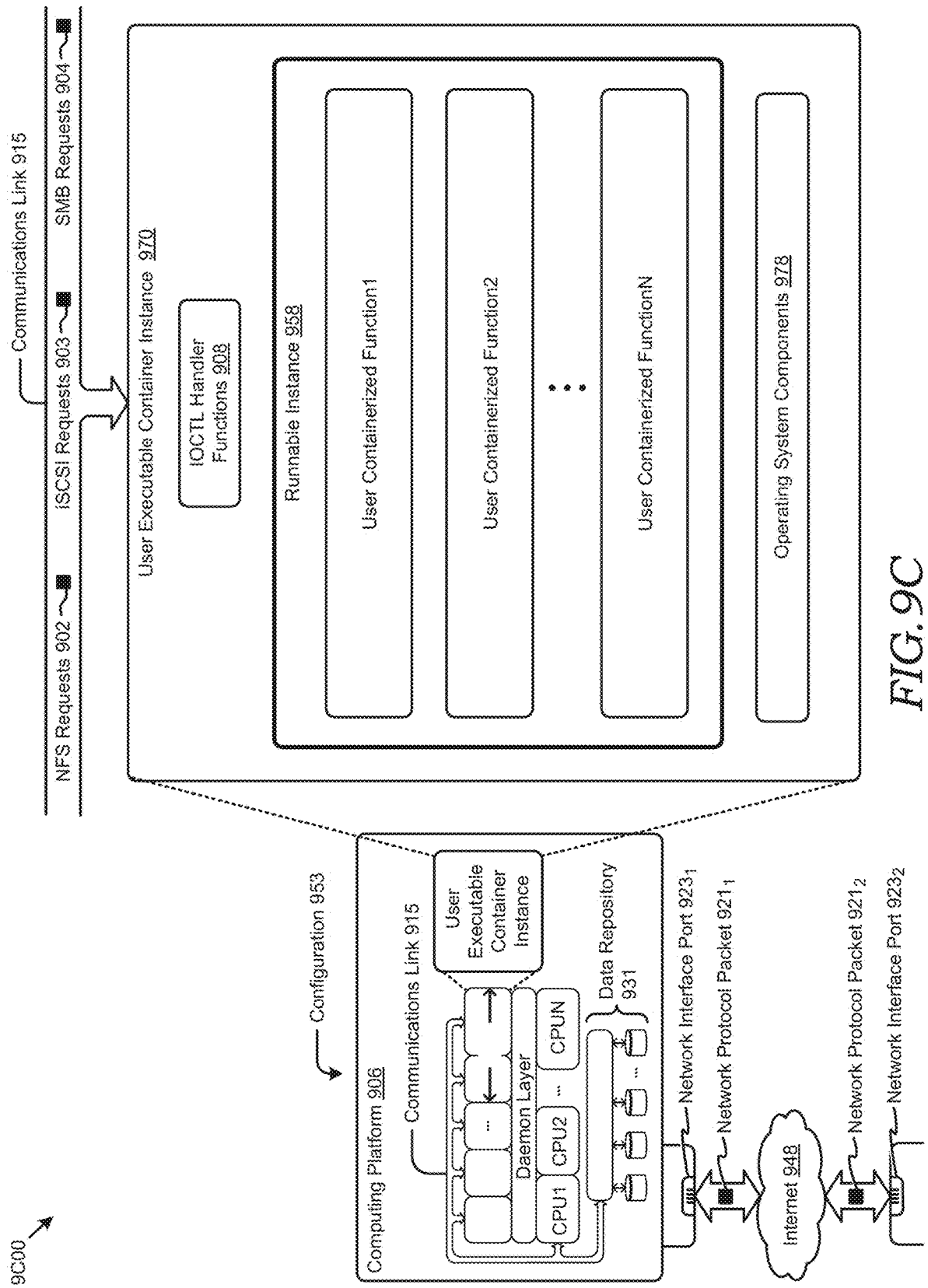

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 970. Configuration 953 includes a daemon layer (as shown) that performs certain functions of an operating system.

User executable container instance 970 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 970.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 9D:
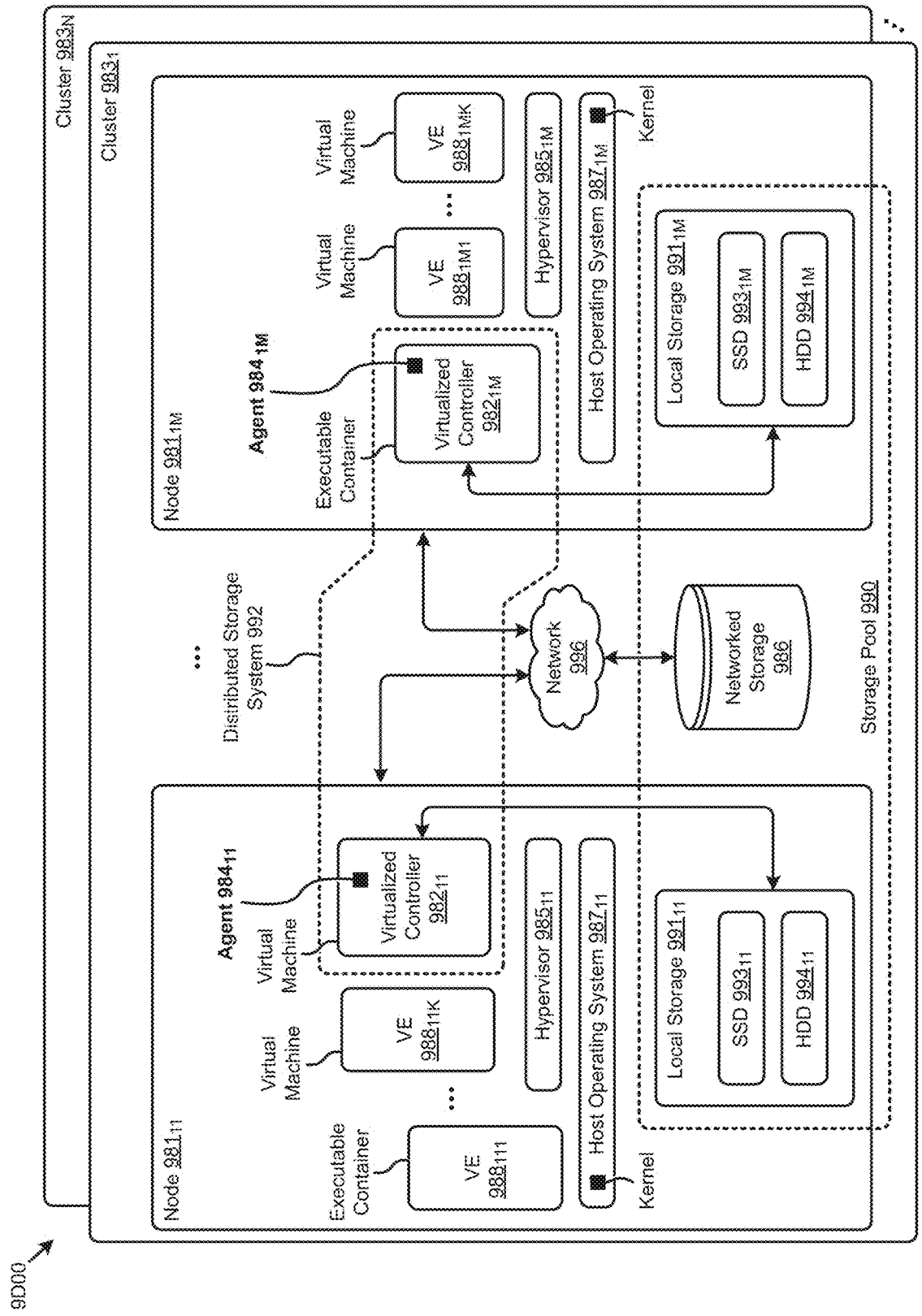

FIG. 9D depicts a distributed virtualization system in a multi-cluster environment 9D00. The shown distributed virtualization system is configured to be used to implement the herein disclosed techniques. Specifically, the distributed virtualization system of FIG. 9D comprises multiple clusters (e.g., cluster $983_1$, . . . , cluster $983_N$) comprising multiple nodes that have multiple tiers of storage in a storage pool. Representative nodes (e.g., node $981_{11}$, . . . , node $981_{1M}$) and storage pool 990 associated with cluster $983_1$ are shown. Each node can be associated with one server, multiple servers, or portions of a server. The nodes can be associated (e.g., logically and/or physically) with the clusters. As shown, the multiple tiers of storage include storage that is accessible through a network 996, such as a networked storage 986 (e.g., a storage area network or SAN, network attached storage or NAS, etc.). The multiple tiers of storage further include instances of local storage (e.g., local storage $991_{11}$, . . . , local storage $991_{1M}$). For example, the local storage can be within or directly attached to a server and/or appliance associated with the nodes. Such local storage can include solid state drives (SSD $993_{11}$, . . . , SSD $993_{1M}$), hard disk drives (HDD $994_{11}$, . . . , HDD $994_{1M}$), and/or other storage devices.

As shown, any of the nodes of the distributed virtualization system can implement one or more user virtualized entities (VEs) such as the virtualized entity (VE) instances shown as VE $9881_{11}$, . . . , VE $9881_{1K}$, . . . , VE $988_{1M1}$, . . . , VE $988_{1MK}$), and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $987_{11}$, . . . , host operating system $987_{1M}$), while the VMs run multiple applications on various respective guest operating systems. Such flexibility can be facilitated at least in part by a hypervisor (e.g., hypervisor $985_{11}$, . . . , hypervisor $985_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $987_{11}$, . . . , host operating system $987_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 990 by the VMs and/or the executable containers.

Multiple instances of such virtualized controllers can coordinate within a cluster to form the distributed storage system 992 which can, among other operations, manage the storage pool 990. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $981_{11}$ can interface with a controller virtual machine (e.g., virtualized controller $982_{11}$) through hypervisor $985_{11}$ to access data of storage pool 990. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 992.

For example, a hypervisor at one node in the distributed storage system 992 might correspond to software from a first vendor, and a hypervisor at another node in the distributed storage system 992 might correspond to a second software vendor. As another virtualized controller implementation example, executable containers can be used to implement a virtualized controller (e.g., virtualized controller $982_{1M}$) in an operating system virtualization environment at a given node. In this case, for example, the virtualized entities at node $981_{1M}$ can access the storage pool 990 by interfacing with a controller container (e.g., virtualized controller $982_{1M}$) through hypervisor $985_{1M}$ and/or the kernel of host operating system $987_{1M}$.

In certain embodiments, one or more instances of an agent can be implemented in the distributed storage system 992 to facilitate the herein disclosed techniques. Specifically, agent $984_{11}$ can be implemented in the virtualized controller $982_{11}$, and agent $984_{1M}$ can be implemented in the virtualized controller $982_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Figure 1:
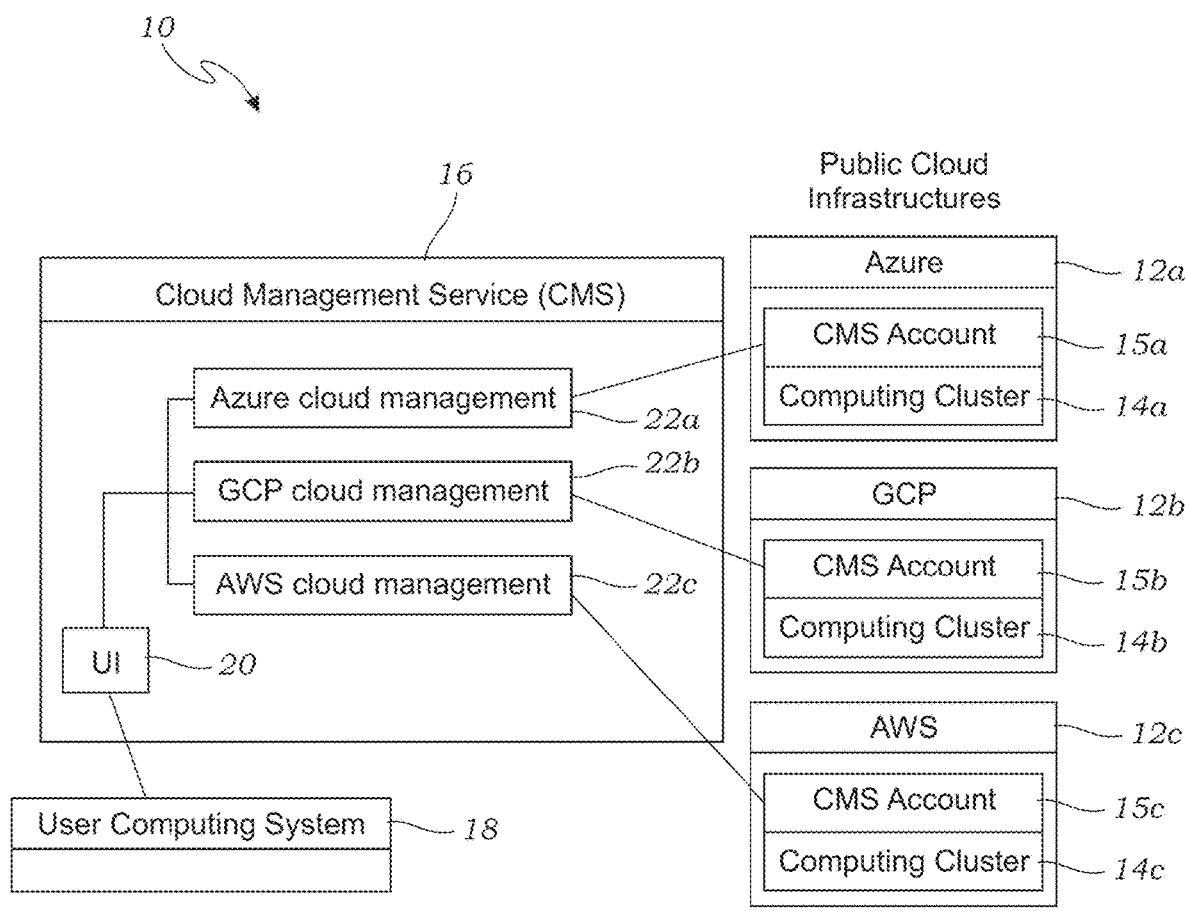
FIG. 1 is a block diagram of a prior art system for bringing-up a computing cluster on any one of a plurality of public cloud infrastructures.
Figure 2:
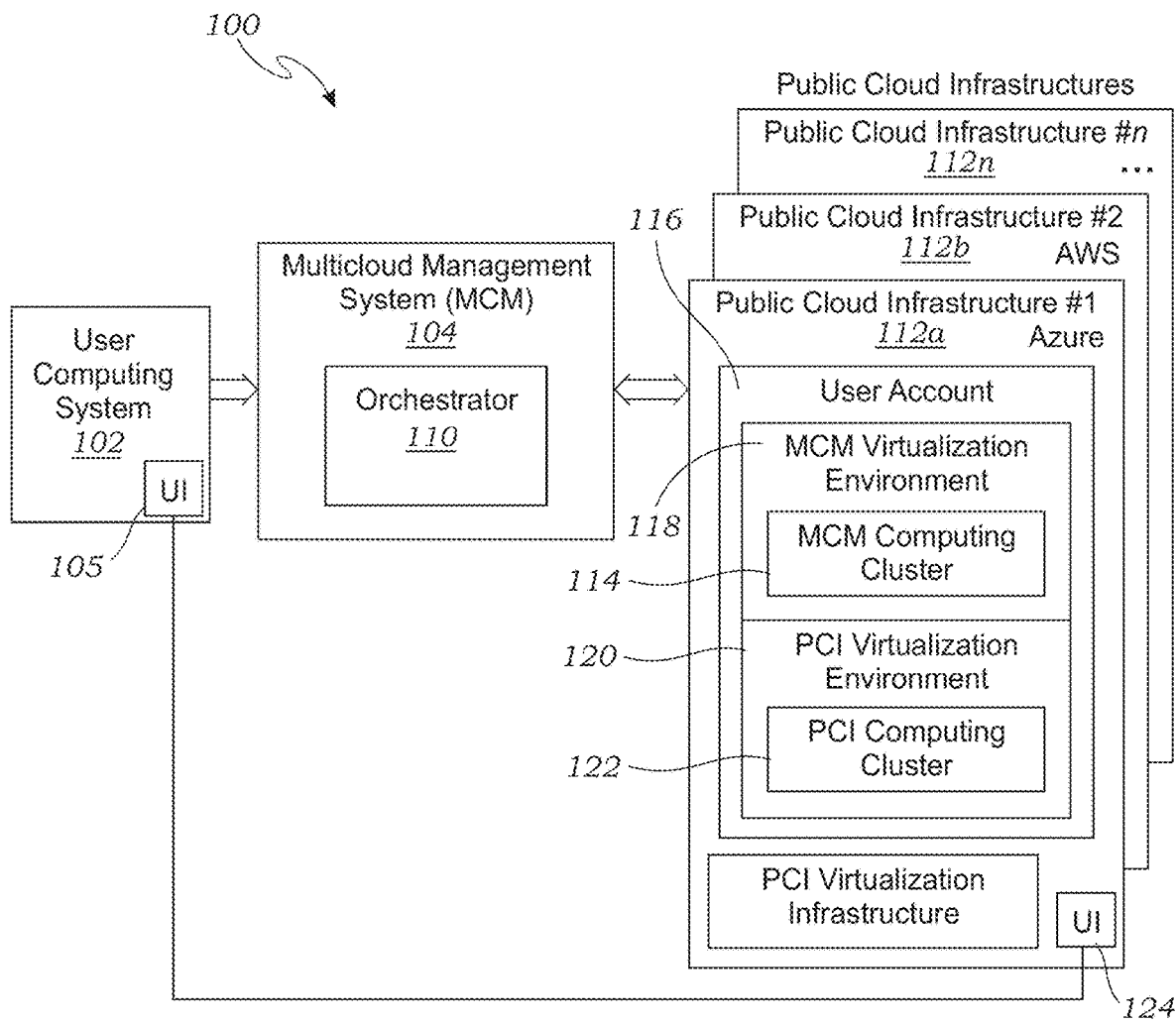
FIG. 2 is a high-level block diagram of a system for bringing-up a computing cluster in a user's account on any one of a plurality of public cloud infrastructures, according to one embodiment of the present invention.

Referring first to FIG. 2, a high-level block diagram of a system 100 for bringing-up a computing cluster 114 on any one of a plurality of public cloud infrastructures 112, according to one disclosed embodiment is illustrated. The system 100 includes a user computing system 102 of a user intending to bring-up a computing cluster 114 on one of the public cloud infrastructures 112. The user computing system 102 is typically in network communication with a multicloud management system 104 (MCM 104) which is configured to receive computing cluster configurations and/or specifications from the user computing system 102 according to user input. For example, a user interface 105 may be installed on the user computing system 102, or the user computing system 102 can access a web-based (e.g., browser based) user interface 106 of the MCM 104.

The MCM 104 may be a private computing system such as an on-premises computing system of the user separate from the user computing system 102, a private cloud computing system provided by a PAAS provider, or other suitable computing system. The detailed description of the embodiments will be described with the MCM 104 being a private cloud computing system provided by a PAAS provider, with the understanding that the MCM 104 can be any suitable computing systems. In such case, the user will typically have an MCM account for a subscription or license to use the PAAS comprising the MCM 104, allowing the user to utilize the MCM 104 to bring-up a computing cluster on a public cloud infrastructure 112. The user also has one or more user's PCI account(s) for a subscription or license to use one or more of the respective public cloud infrastructures 112 on which the computing cluster will be brought up by the MCM 104. The user selects one of the public cloud infrastructures 112 for which it has a service subscription. For example, the selection of one of public cloud infrastructures may be part of the user's profile in its account on the MCM 104, or the selection can simply be a setting on the MCM 104 which is selected when a user instructs the MCM 104 to bring-up a computing cluster on the selected public cloud infrastructure 112.

The MCM 104 includes an orchestrator 110. The orchestrator 110 is a software module of the MCM 104 which is configured to receive computing cluster specifications input from the user computing system 102, and then determine and transmit bring-up commands to a selected one of the public cloud infrastructures 112 to bring-up a computing cluster 114 on the public cloud infrastructure 112. In one aspect, the bring-up commands may include only idempotent operations. An operation is "idempotent" if it can be carried out any number of times until it is successful, and even if the operation fails, it can be repeated at a later time and/or under a different set of conditions, at which time, or under which different set of conditions the idempotent operation can successfully execute. Alternatively, the bring-up commands may comprise only atomic operations. An operation is "atomic" which either completely, successfully executes, or if not, it has no effect on the system. In another embodiment, the bring-up commands may comprise only idempotent operations and/or atomic operations.

As illustrated in FIG. 2, in one innovative aspect of the system 100, the MCM 104 brings-up an MCM computing cluster 114 in an account 116 on the public cloud infrastructure 112a, such as a user's PCI account 116. Although certain embodiments described herein utilize a user's PCI account, it is understood that the account may be any suitable account 116 on the public cloud infrastructure 112a. FIG. 2 shows the MCM computing cluster 114 being brought-up on public cloud infrastructure 112a, just as an example, as the MCM computing cluster 114 could be brought up on any of public cloud infrastructure 112a, 112b . . . 112n. The computing cluster 114 may include one or more nodes 140 (see FIG. 3) each comprising a respective virtual machine 142 (see FIG. 3). FIG. 2 shows that the MCM computing cluster 114 is brought-up in an MCM virtualization environment 118 which is generated by the MCM 104. FIG. 2 also depicts that the user may bring-up, within the same user's account 116, a PCI computing cluster 122 within a public cloud infrastructure (PCI) virtualization environment 120 of public cloud infrastructure 112a. For example, a cloud virtualization module (not shown in FIG. 2) of the public cloud infrastructure 112a is utilized by the user using a user interface 124 of the public cloud infrastructure 112a to bring-up the PCI computing cluster 122 within the PCI virtualization environment 120.

Figure 3:
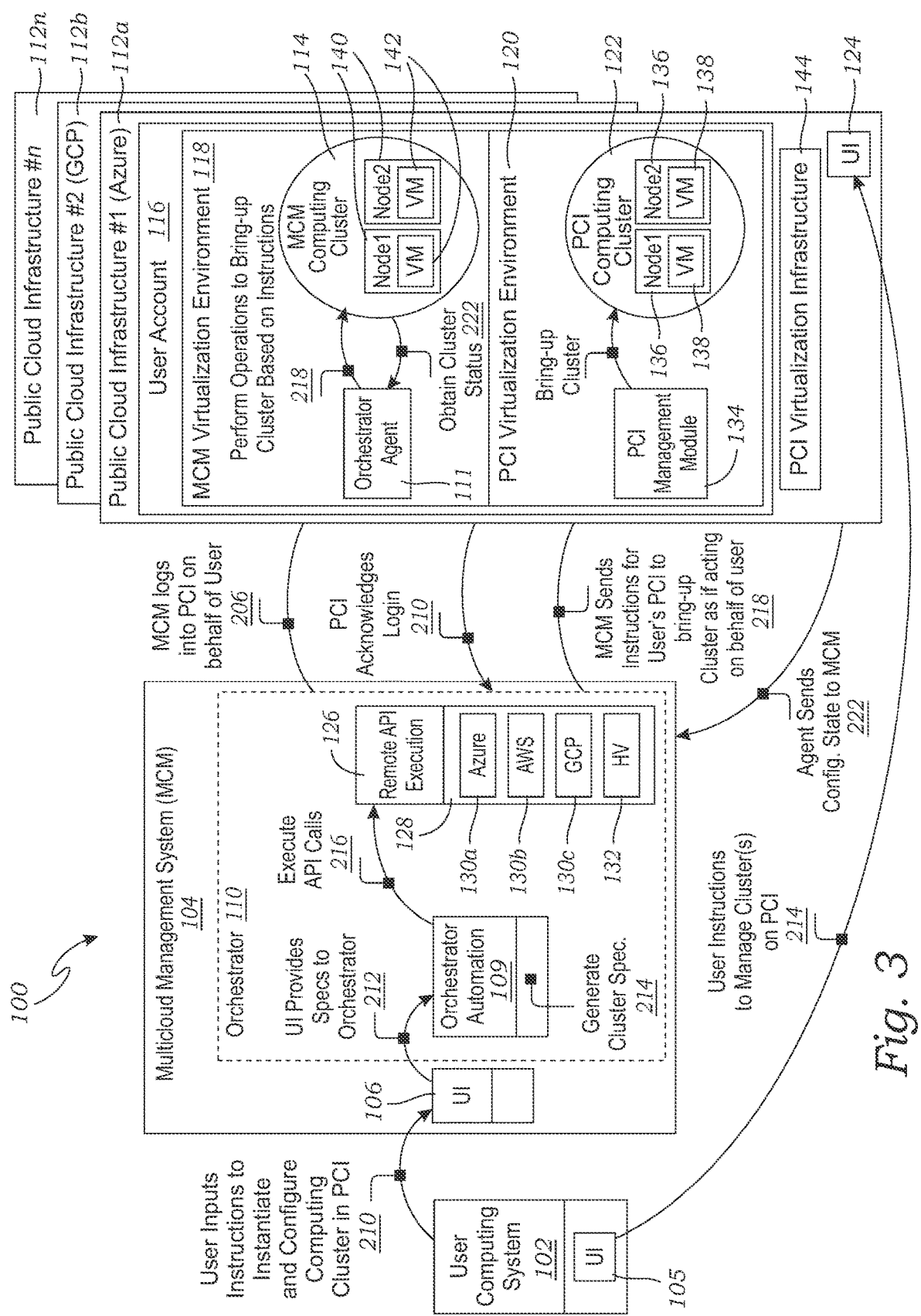
FIG. 3 is a detailed block diagram of a system and process flow for bringing-up a computing cluster in a user's account any one of a plurality of public cloud infrastructures, according to one embodiment, according to one embodiment.

Turning to FIG. 3, a more detailed block diagram of an embodiment of the system 100 of FIG. 2 for bringing-up a computing cluster 114 in a user's account on any one of a plurality of public cloud infrastructures 112a, 112b . . . 112n, is illustrated. FIG. 3 also illustrates a process flow of the system 100 for a method for bringing-up a computing cluster 114. As shown in FIG. 3, the multicloud management system 104 includes an orchestrator 110. The orchestrator 110 includes an orchestrator automation module 109, which is configured to generate a cluster specification based on the cluster requirements provided by the user via the user interface 106 (or UI 105, as the case may be). The orchestrator 110 also includes a remote API execution module 126. The remote API execution module 126 includes a library 128 of API calls 130 comprising bring-up commands for each respective public cloud infrastructure 112. For example, the illustrated embodiment shows that the library 128 of API calls includes API calls 130a for Azure, API calls 130b for AWS, and API calls 130c for GCP. The library 128 may also include API calls 132 for a hypervisor, such as ACROPOLIS™ Hypervisor (AHV), available from Nutanix, Corp., San Jose, California.

The single orchestrator 110 is configured to bring-up a computing cluster on any of the plurality of public cloud infrastructures 112. The single orchestrator 110 is configured to receive generic cluster specifications (e.g., requirements and/or instructions) from a user for a computing cluster 114. In other words, the generic cluster specifications are not specific to any particular one of public cloud infrastructures 112a, 112b . . . 112n. For instance, the UI 105 or UI 106, is configured to be generic such that it receives input instructions (e.g., specification for a computing cluster 114) from a user for instantiating a computing cluster 114 that are not specific to any of the plurality of public cloud infrastructures 112, and provides generic instructions to the orchestrator 110 which are also generic, i.e., not specific to any of the plurality of public cloud infrastructures 112. The orchestrator 110 is configured to receive the generic specifications for the computing cluster 110, and generate a cluster specification and determine bring-up commands (e.g., API calls 130 and other instructions) for a specific, selected public cloud infrastructure 112 of the plurality of public cloud infrastructures, instead of having a different orchestrator configured for each respective public cloud infrastructure 112, such as a first orchestrator for Azure 112a, a second orchestrator for AWS 112b, and so on.

The multicloud management system 104 is also configured to load an orchestrator agent 111 onto the selected public cloud infrastructure 112. The orchestrator agent 111 is configured to execute bring-up commands and to communicate cluster status data to the orchestrator 110. For example, the orchestrator agent 111 may be configured to access metadata 322 (see, e.g., FIG. 7) stored within a metadata store 324 (see, e.g., FIG. 7) regarding the status of the bring-up of the computing cluster 114 on the public cloud infrastructure 112, and then generate and transmit a cluster status message including the cluster status data to the orchestrator 109.

The orchestrator 110 is configured to receive the cluster status data from the orchestrator agent 111, analyze the cluster status data, and determine cluster bring-up commands to bring-up the computing cluster 114 according to the cluster specification.

As further shown in FIG. 3, each public cloud infrastructure 112 may also include a public cloud infrastructure (PCI) management module 134. The PCI management module 134 is configured to bring-up a PCI computing cluster 122 within the PCI virtualization environment 120. The computing cluster 122 may comprise one or more nodes 136 each comprising a respective virtual machine (VM) 138.

Figure 4:
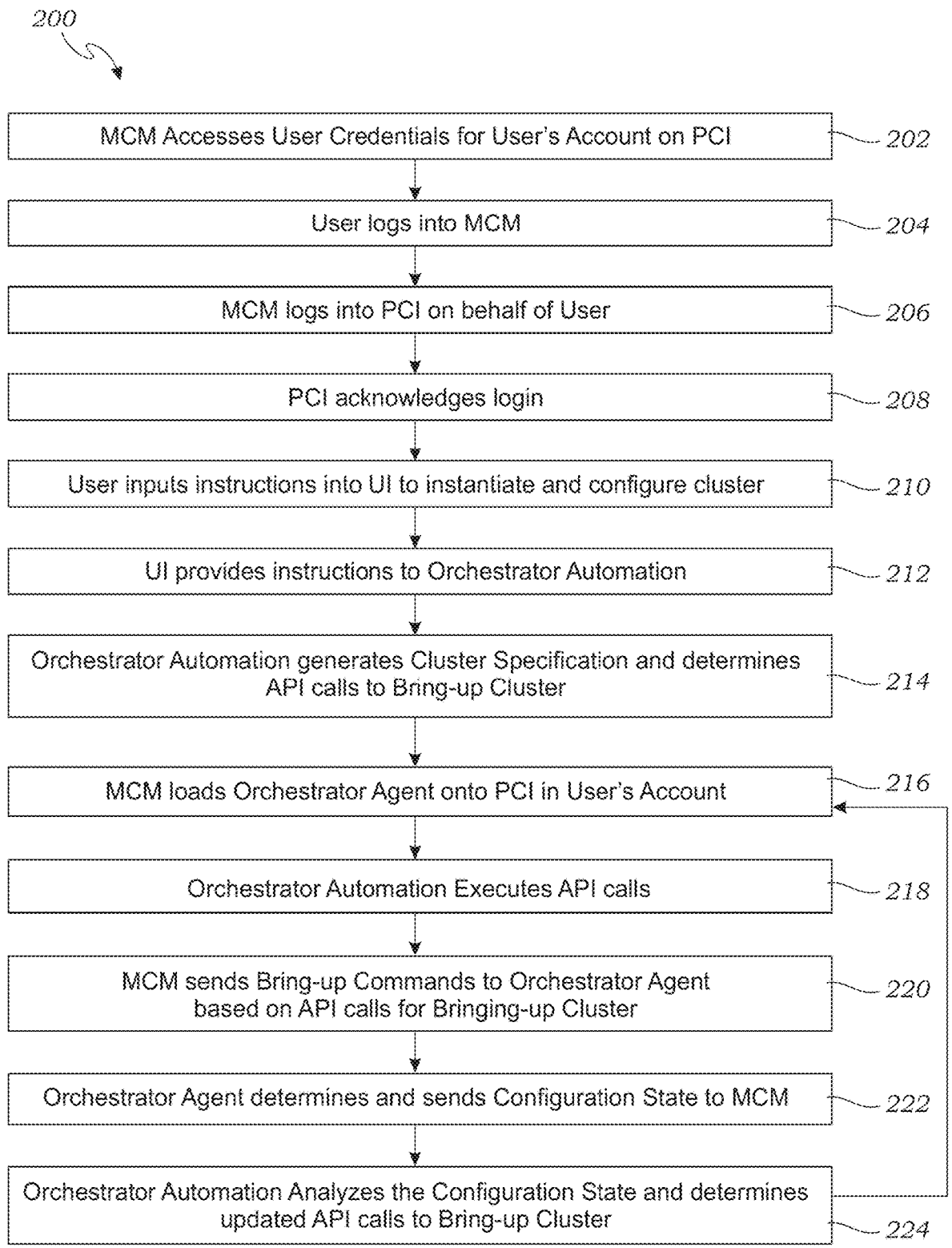
FIG. 4 is a flow chart of a method of using the system in FIGS. 2 and 3 for bringing-up a computing cluster in a user's account on any one of a plurality of public cloud infrastructures, according to one embodiment.

With reference to the process flow shown in FIG. 3 and the flow chart of FIG. 4, a method 200 for bringing-up a computing cluster 114 on a public cloud infrastructure 112a will now be described in detail. At step 202, the MCM 104 accesses the user's credentials for the user's PCI account 116 on a selected one of the public cloud infrastructures 112, such as public cloud infrastructure 112a. This may be done in any suitable manner, as described herein.

At step 204, the user logs into the user's MCM account 116. At step 206, the MCM logs into the user's PCI account 116 on the public cloud infrastructure 112a, for example, by using the user's credentials. At step 208, the public cloud infrastructure 112a acknowledges the login. Steps 206 and 208 may be performed at any suitable point in the method 200, prior to the MCM sending instructions to the public cloud infrastructure 112a.

At step 210, the user utilizes the user computing system 102 to input instructions (e.g., generic instructions not specific to any particular public cloud infrastructure 112) into the UI 105 or UI 106 to instantiate a computing cluster 114 on the selected public cloud infrastructure 112a and configure the cluster 114 having a certain set of specifications. At step 212, the UI 105 or UI 106 provides the instructions (e.g., generic instructions) to the orchestrator 110, and more specifically to the orchestrator automation 109 of the orchestrator 110.

At step 212, the UI 105 or UI 106 provides the instructions and specifications (e.g., generic instructions and specifications not specific to any particular public cloud infrastructure 112) to the orchestrator 110. At step 214, the orchestrator automation 109 generates a cluster specification and determines public cloud infrastructure specific API calls 130 for the specific public cloud infrastructure 112a to bring-up a computing cluster 114 according to the cluster specification.

At step 216, the MCM 104 loads the orchestrator agent 111 onto the public cloud infrastructure 112a in the user's account 116 within the MCM virtualization environment 118. In other words, the MCM 104 provisions a node on the public cloud infrastructure 112a in the user's account and loads the orchestrator agent 111 onto the node.

At step 218, the orchestrator automation executes API calls 130a from the API library 126 for the selected public cloud infrastructure 112a. At step 220, the MCM sends first public cloud infrastructure specific bring-up commands to the orchestrator agent 111 on the public cloud infrastructure 112a based on the API calls 130a to bring-up the computing cluster 114 in the user's account 116 on the public cloud infrastructure 112a. The bring-up commands may be idempotent operations and/or atomic operations, which may be repeated until such bring-up commands are successful.

At step 222, the orchestrator agent 111 determines a configuration state and sends the configuration state indication to the MCM 104. The configuration state indication includes information corresponding to the status of the computing cluster 114 being brought-up on the public cloud infrastructure 112a. At step 224, the orchestrator automation 109 analyzes the configuration state indication and determines updated API calls 130 to bring-up the computing cluster 114 according to the cluster specification. The method 200 then repeats steps 216-224 until the computing cluster 114 is fully brought-up according to the cluster specification, or the process is terminated, for example by a failure or error timeout or user intervention.

The system 100 includes one or more software applications stored on one or more storage devices comprising "computer readable medium." The term "computer readable medium" means any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. The system 100 also includes one or more processors configured to execute the instructions stored on the computer readable medium. The software application(s) stored on the computer readable medium and processors may be disposed on or in any of the systems of the of the system 100, including the user computing system 102, the multicloud management system 104, the public cloud infrastructures 112, etc. Such software applications on computer readable medium and processors may be integrated into suitable computers, such as computer servers, personal computers, etc. The software application(s) and processor(s) are configured to program the system 100 to perform the method embodiments as described herein.

Accordingly, the system 100 and corresponding methods and non-transitory computer readable medium accomplish bring-up of a computing cluster 114 on any one of a plurality of different public cloud infrastructures 112 which overcomes the drawbacks of previously available systems and methods, such as the system 10, described above. First, the user can choose the public cloud infrastructure 112 it desires for bringing-up the computing cluster 114. For instance, the user can select the public cloud infrastructure 112 that is the best fit, and/or, most compatible with the users work flow, tools, as well as other considerations, such as cost.

Furthermore, the system 100 and method 200 bring-up the computing cluster 114 in the user's account 116 on the public cloud infrastructure 112. Hence, the user has full access to the computing cluster 114 through the user's account 116 on the public cloud infrastructure 112. Therefore, the user can monitor and control the costs associated with the user of the computing resources utilized by the computing cluster 114 on the public cloud infrastructure 112. Furthermore, the user has immediate and full access to all of the native services, features and tools of the public cloud infrastructure 112. In addition, the user has full and direct control over the security of its data used and stored in the computing cluster 114. The user can utilize its own computer security, including its own security scripts and other security software that the user's security engineers and architects may have devised and/or licensed, to secure the computing cluster 114. If needed, the user can also ensure that the computer security of the computing cluster meets any applicable government regulations covering the protection and security of the data involved. The user may also simply migrate the user's on-premises computing infrastructure, including computing clusters, onto the public cloud infrastructure 112

The innovative computer architecture of the system 100 and method 200 also reduces the complexity of the system and provides for more efficient scaling and extension to use with additional public cloud infrastructures 112. In particular, the system 100 and method 200 utilize a multicloud management module 104 having a single orchestrator 110, as opposed to the different and separate cloud management modules 22 required for each respective public cloud infrastructure 112 in the prior art system 10. This allows the system 100 and method 200 to use a single UI 105 and interface between the UI 105 and the multicloud management module 104. Moreover, compatibility with additional public cloud infrastructures 112 only requires more manageable modifications to the single orchestrator 110 and adding the appropriate API calls 130 to the library 128 for the added public cloud infrastructures 112.

Furthermore, as the MCM computing cluster 114 and the PCI computing cluster 122 are in the same account on the public cloud infrastructure 112, the user is able to utilize tools and services which interoperate with both the MCM computing cluster 114 and the PCI computing cluster 122. For instance, a load balancer can be used to direct traffic MCM computing cluster 114 and the PCI computing cluster 122. Moreover, the user is not limited to a load balancer provided by the cloud management service 16 as in legacy systems 10, but can use any suitable load balancer such as one provided as part of the public cloud virtualization infrastructure 144, or by the user.

Figure 5:
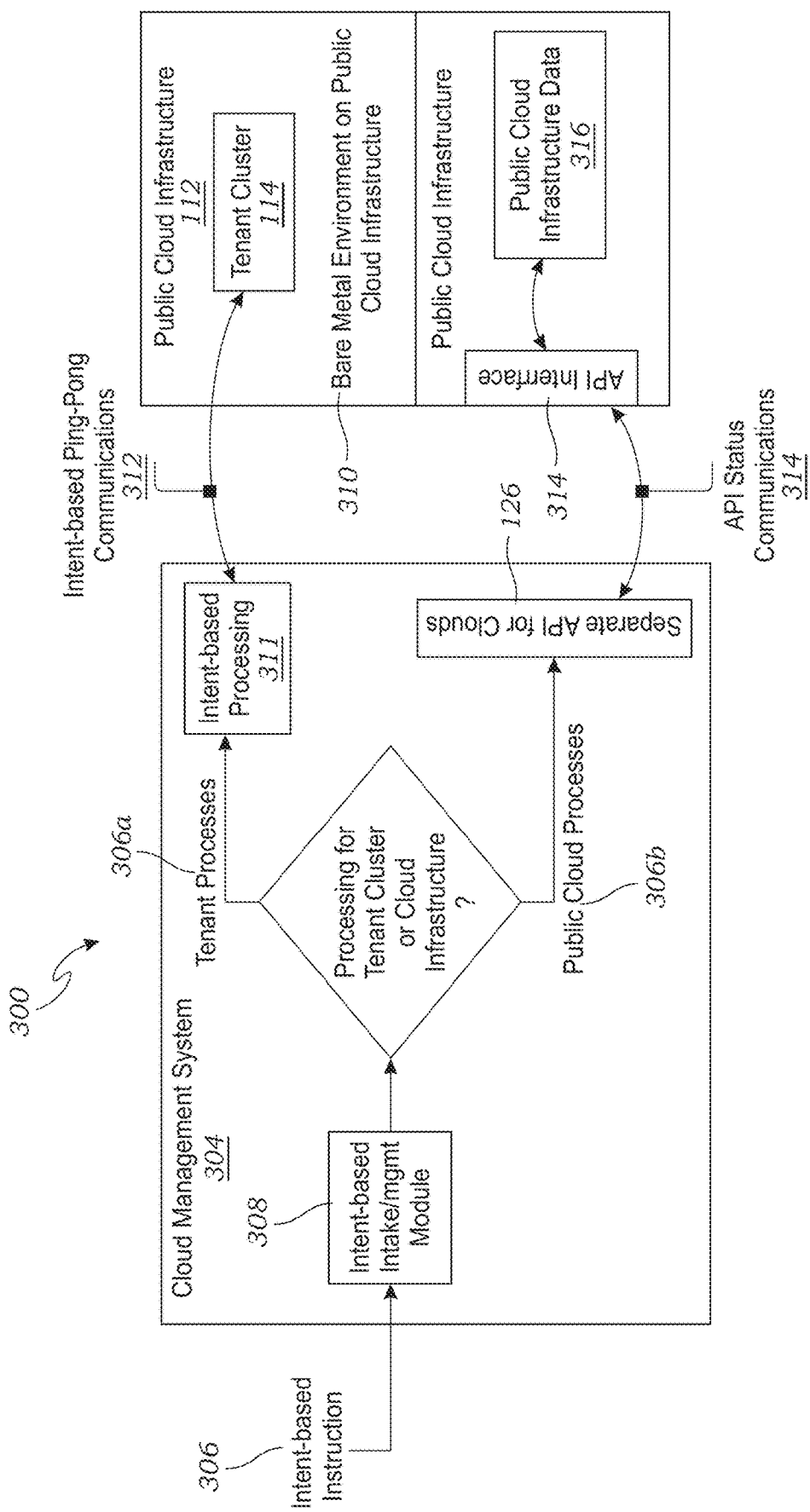
FIG. 5 is a high-level diagram of an intent-based communication system for bringing-up a computing cluster on a public cloud infrastructure, according to another embodiment of the disclosed inventions.

Turning now to FIG. 5, a high-level diagram illustrates a system 300 for bringing-up a computing cluster 114 (also referred to as the "tenant cluster 114") on a public cloud infrastructure 112 using an expressed intent-based communication technique. The system 300 includes a cloud management system 304. The cloud management system 304 may be the same or similar to the multicloud management system 104 of the system 100, except that the cloud management system 304 does not have to be configured to bring-up a computing cluster 114 on any one of a plurality of different public cloud infrastructures 112, although in some embodiments it is configured to bring-up a computing cluster 114 on any of a plurality of different public cloud infrastructures 112a, 112b . . . 112n (see, e.g., FIG. 6 and FIG. 7).

The expressed intent-based communication technique is also referred to as a "ping and pong" or "pings and pongs" intent-based protocol because it involves status messages sent from the public cloud infrastructure 112 to the cloud management system 304 which acts as "pings," to which the cloud management system 304 directly responds with a "pong" comprising an expressed intent.

As illustrated in FIG. 5, the cloud management system 304 receives an intent-based instruction 306 (also referred to as an "expressed intent 306") for bringing-up the tenant cluster 114. The intent-based instruction 306 is a high level description of a desired configuration for the computing cluster. For instance, the intent-based instruction 306 may instruct to provision a two node computing cluster having a desired networking connection. This is in contrast to detailed bring-up instructions, such as API calls, which can be directly executed by the public cloud infrastructure 112 to bring-up the tenant cluster 114 to a desired configuration.

The cloud management system 304 includes an intent-based intake/management module 308 which receives the expressed intent 306, and at step 310, the module 308 determines whether the expressed intent 306 is for processing by the tenant cluster 114 (i.e., a tenant process 306a) or for processing by the public cloud infrastructure 112 (i.e., a public cloud process 306b). If the expressed intent 306 is for processing by the tenant cluster 114, the expressed intent 306 is communicated to the tenant cluster 114 in a bare metal environment 310 on the public cloud infrastructure 114. The expressed intent 306 is then processed using an intent-based processing 311 and a ping-pong communication protocol 312, as described in further detail with respect to FIGS. 7 and 8. More generally, the ping-pong communication protocol 312 comprises asynchronous, periodic, cluster status messages, called "pings," sent from the tenant cluster 114 (or an orchestrator agent 111 of the tenant cluster 114, see FIG. 7) to the cloud management system 104, to which the cloud management system 104 directly responds with expressed intents based on the ping, referred to as a "pong". Because the pong from the cloud management system 104 is sent in direct response to the ping, the public cloud infrastructure 112 recognizes the pong as being authenticated so that it can pass firewalls and/or security, and the pong can be sent via any socket created at any point in time, such as the same open RPC socket used to transmit the ping, resulting in a more fault tolerant communication protocol than previously disclosed communication protocols, such as that described with respect to the system 10, above.

If the expressed intent 306a is a public cloud process 306b for processing by the public cloud virtualization infrastructure 144 (see FIG. 7), the cloud management system 304 executes API calls 130 using remote API execution module 126 which are processed by the public cloud infrastructure 112, such as by an API interface 314 of the public cloud infrastructure 112. The API calls 130 (see FIG. 7) are processed using an API status communications protocol 314, which accesses public cloud infrastructure data 316, as described in further detail with respect to FIG. 7.

Figure 6:
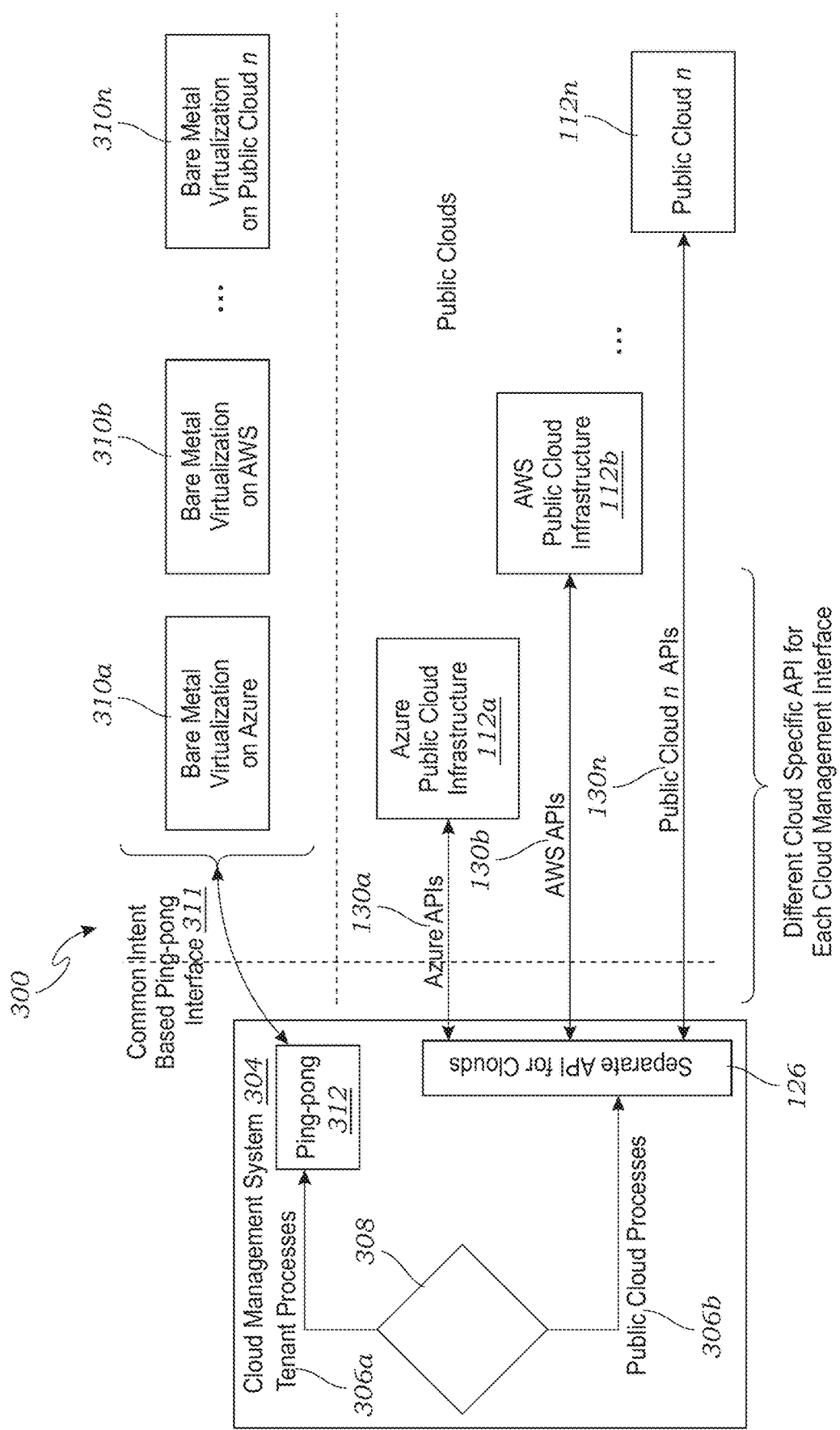
FIG. 6 is another high-level diagram of the intent-based communication system of FIG. 5 showing the common interface for tenant processes versus the separate API interfaces for cloud provider processes, according to one embodiment.

Referring to FIG. 6, another high-level diagram of the intent-based communication technique of FIG. 5 is illustrated which shows the common communication interface 311 for tenant processes 306a versus separate API interfaces for public cloud processes 306b. As FIG. 6 shows, the cloud management system 304 is configured to provide the intent-based ping-pong communications 312 via a common ping-pong interface 311 to any one of a plurality of different public cloud infrastructures 112. In other words, instead of a different interface for each public cloud infrastructure 112, the cloud management system 304 uses the same interface 311 for the intent-based ping-pong communications 312 of the tenant processes 306a, regardless of which public cloud infrastructure 112 the computing cluster. As shown in FIGS. 5 and 6, the computing cluster 114 may be brought-up in the bare-metal virtualization environment 310 on the public cloud infrastructure 112.

By contrast, as shown in FIG. 6, the communications for the public cloud processes 306b are provided using separate cloud specific APIs 130 for each different public cloud infrastructure 112 defining a different cloud management interface for each public cloud infrastructure 112. Hence, there are Azure APIs 130a defining an Azure interface for the Azure public cloud infrastructure 112a, AWS APIs 130b defining an AWS interface for the AWS public cloud infrastructure 112b, and Public Cloud n APIs 130n for the Public Cloud n infrastructure 112n.

Figure 7:
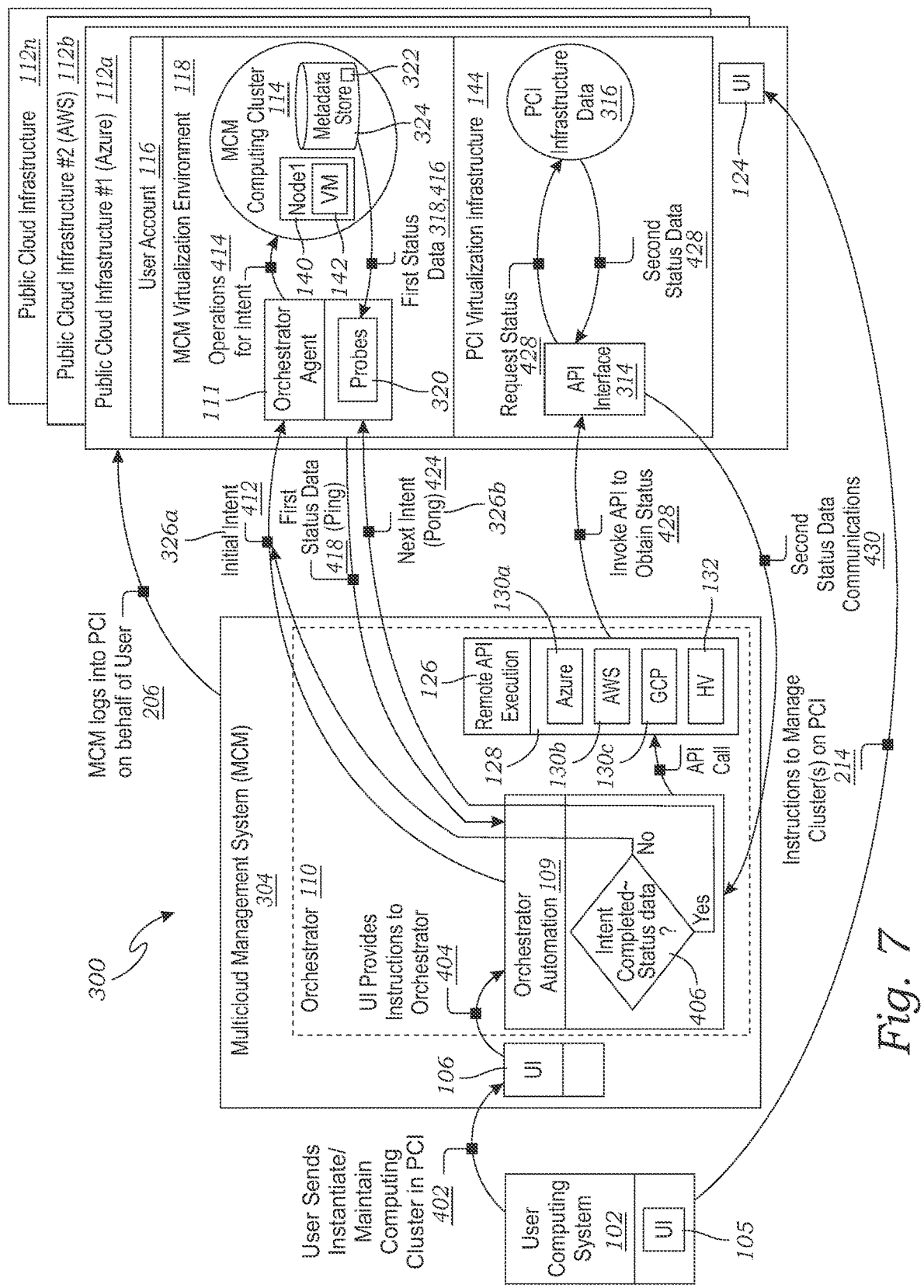
FIG. 7 is a detailed block diagram of a system for using an intent-based communication technique for bringing-up a computing cluster on a public cloud infrastructure, according to one embodiment.

Turning now to FIG. 7, a more detailed block diagram of an embodiment of the system 300 of FIGS. 5 and 6 for bringing-up a computing cluster 114 in a user's account 116 on a public cloud infrastructure 112 is illustrated. The system 300 is shown as being configured to bring-up a computing cluster on any one of a plurality of public cloud infrastructures 112a, 112b . . . 112, but the system 300 does not have to be configured to bring-up a computing cluster 114 on any one of a plurality of different public cloud infrastructures 112. However, it is understood that the system 300 does not have to be configured to bring-up a computing cluster 114 on a plurality of different of public cloud infrastructures 112, as the expressed intent-based communication protocol can also be used on a system configured to bring-up a computing cluster 114 on only one public cloud infrastructure 112. However, the description of the system 300 will be described as being configured for bringing-up a computing cluster 114 on any one of plurality of public cloud infrastructures 112, with the understanding that the system 300 can also be configured for only one public cloud infrastructure 112. FIG. 7 also illustrates a process flow of the system 300 for methods 350 and 400 (see FIGS. 8A and 8B) for bringing-up a computing cluster 114 on the public cloud infrastructure 112.

The system 300 includes a cloud management system 304. The cloud management system 304 ("MCM 304") may be the same or similar to the multicloud management system 104 of the system 100, except that, in some cases, the cloud management system 304 does not have to be configured to bring-up a computing cluster 114 on any one of a plurality of different public cloud infrastructures 112, as explained above. Accordingly, the MCM 304 includes at least the same functions and features as the MCM 104, described above.

The multicloud management system 304 includes an orchestrator 110, which is essentially the same as the orchestrator 110 described herein with respect to the system 100. The orchestrator 110 includes an orchestrator automation module 109 and a remote API execution module 126, which are substantially the same, and include at least the same functions and features, as the orchestrator automation module 109 and remote API execution module 126 of the system 100.

The MCM 304 is also configured to load an orchestrator agent 111 onto the selected public cloud infrastructure 112, same or similar to the MCM 104 of the system 100. As in the system 100, the orchestrator agent 111 is configured to receive expressed-intents from the orchestrator automation module 109, determine bring-up operation based on the expressed-intents, execute bring-up commands within the MCM virtualization environment 118, and communicate first status data 318 to the orchestrator automation module 109. In addition, the orchestrator agent 111 includes probes 320 for obtaining cluster status data 318 (also referred to as "first status data 318"). For example, the probes 320 are configured to access metadata 322 corresponding to the configuration status of the computing cluster 114. The metadata 322 may be stored in a metadata store 324. The first status data 318 comprises the metadata 322 regarding the status of the computing cluster 114.

As shown in FIG. 7, the public cloud infrastructure 112 also includes a PCI virtualization infrastructure 144 having an API interface 314 of the public cloud infrastructure 112. The API calls 130 are processed using an API status communications protocol 314, which accesses/requests public cloud infrastructure data 316 (also referred to as "second status data 316") regarding the status of the operations and configuration of elements of the PCI virtualization infrastructure 144, and then transmits the second status data 316 to the orchestrator automation 109.

The orchestrator automation module 109 also performs the function of the intent-based intake/management module 308 described with respect to FIGS. 5 and 6. In addition, the orchestrator automation module 109 and orchestrator agent 111 are configured to provide an interface between the MCM 304 and the public cloud infrastructure 112. The orchestrator automation module 109 is configured to receive intent-based instruction(s) and/or specification(s) 306 (see FIG. 5) from the user computing system 102 (via the UI 105 or UI 106), and determine an expressed-intent 326 for configuring the computing cluster 114, according to such instructions and/or specifications 306. The orchestrator automation module 109 determines whether the intent-based instruction 306 is for processing by the orchestrator agent 111 (i.e., a tenant process 306a in FIGS. 5 and 6) or for processing by the API interface 314 of the public cloud infrastructure (i.e., a public cloud process 306b in FIGS. 5 and 6). If the intent-based instruction 306 is for processing by the orchestrator agent 111, the orchestrator automation module 109 determines an expressed-intent 326a for bringing-up the computing cluster 114 on the public cloud infrastructure 112, and in conjunction with the orchestrator agent 111, processes the expressed-intent 326a using the ping-pong communication protocol 312 (see FIGS. 5 and 6).

The ping-pong communication protocol 312 is an innovative method of communicating the expressed-intents 326a from the MCM 304 to the public cloud infrastructure 112. As shown in FIG. 7, the ping-pong communication protocol 312 includes the orchestration automation module 109 transmitting an initial expressed-intent 326a to the orchestrator agent 111 loaded onto the public cloud infrastructure 112a (or other selected public cloud infrastructure 112). The orchestrator agent 111 receives the initial expressed-intent 326a and determines and executes cluster bring-up operations based on the initial expressed-intent 326a. The orchestrator agent 111 uses the probes 320 to obtain first status data 318 regarding the status of the computing cluster 114 being brought-up. The probes 320 access metadata 322 corresponding to the configuration status of the computing cluster 114 and store the metadata in a metadata store 324 from which the probes 320 access the metadata 322. The orchestrator agent 111 then periodically and asynchronously transmits the first status data 318 to the orchestrator automation module 109, called a "ping." The orchestrator automation module 109 then analyzes the first status data 318 and determines a next expressed-intent 326b based upon the first status data 318, the intent-based instructions and/or specifications 306, and/or API status communications 314. The orchestrator automation module 109 then transmits the next expressed intent to the orchestrator agent 111 in direct response to the ping, wherein the next expressed intent constitutes a "pong" in response to the "ping." For instance, if, based upon the first status data 318, the orchestrator automation module 109 determines that the current expressed intent 326 has not been successfully achieved, the orchestrator automation module 109 re-transmits the current expressed intent 326 (e.g., the initial expressed intent 326a) to the orchestrator agent 111 in a pong. Alternatively, if the orchestrator automation module 109 determines that the current expressed intent 326 has been successfully achieved, the orchestrator automation module 109 determines a next expressed intent 326b and transmits the next expressed intent 326b to the orchestrator agent 11. This ping and pong process is repeated until the computing cluster 114 is successfully brought-up according to all of the instructions and specifications 306, or the process times out or is stopped by the user or some other process.

When the orchestrator automation module 109 determines that the intent-based instruction 306 is a public cloud process 306b (see FIGS. 5 and 6) for processing by the API interface 314 of the public cloud infrastructure, the cloud management system 304 executes cloud specific API calls 130 using remote API execution module 126 which are then processed by the public cloud infrastructure 112, such as by an API interface 314 of the public cloud infrastructure 112. The API calls 130 are processed using an API status communications protocol 314 (see FIG. 5). The API interface 314 is configured to access public cloud infrastructure data 316, for example, from a PCI infrastructure metadata store. The API interface communicates the public cloud infrastructure data 316 (also referred to herein as "second status data 316") to the orchestrator automation 109. The orchestrator automation 109 determines whether the API calls 130 have been successfully executed by the public cloud infrastructure 112 based on the second status data 316. The orchestrator automation 109 may then determine additional API calls 130 based on the second status data 316 and the intent-based instruction(s) and/or specification(s) 306.

With reference to the process flow shown in FIG. 7 and the flow chart of FIG. 8, a method 350 for bringing-up a computing cluster 114 on a public cloud infrastructure 112a using the ping-pong communication protocol will now be described. At step 352, the MCM 304 transmits to the public cloud infrastructure 112 a first expressed intent 326a for bringing-up a computing cluster 114 on the public cloud infrastructure. At step 354, the MCM 304 receives periodic status messages comprising cluster status data from the public cloud infrastructure 112 reflecting the configuration state of the computing cluster 114. At step 356, the public cloud infrastructure 112 receives the first expressed intent 326a.

At step 358, the MCM 304 determines whether the first expressed intent 326a has been achieved. When the expressed intent 326a has not been successfully achieved, the method 350 returns to step 352 and MCM 304 re-transmits the first expressed intent 326a to the public cloud infrastructure 112. When the MCM 304 determines that the first expressed intent has been achieved, at step 360, the MCM 304 transmits the next expressed intent 326b to the public cloud infrastructure 112. The method 350 repeats this process until the computing cluster 114 is successfully brought-up according to all of the instructions and specifications 306, or the process times out or is stopped by the user or some other process.

Figure 8A:
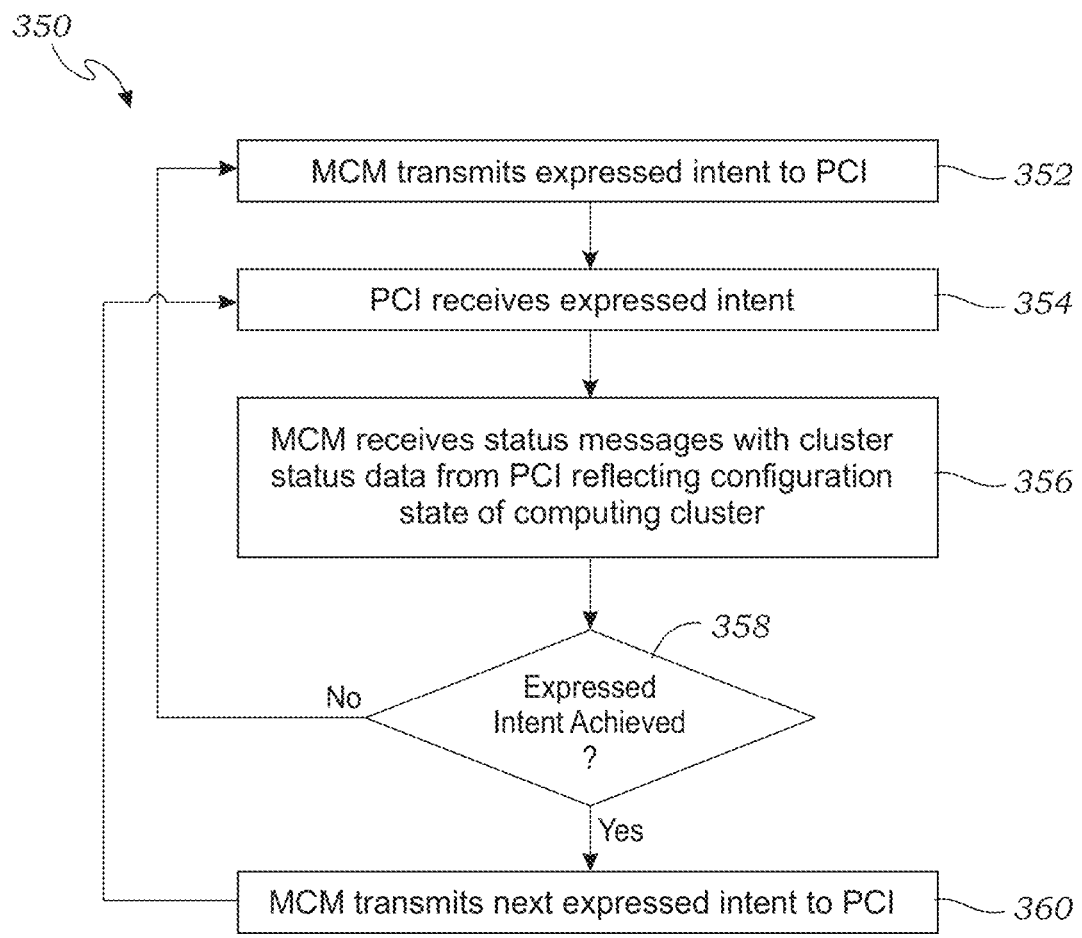
FIG. 8A is a is a flow chart of a method of using the techniques and systems illustrated in FIGS. 5-7 for bringing-up a computing cluster on a public cloud infrastructure, according to one embodiment.
Figure 8B:
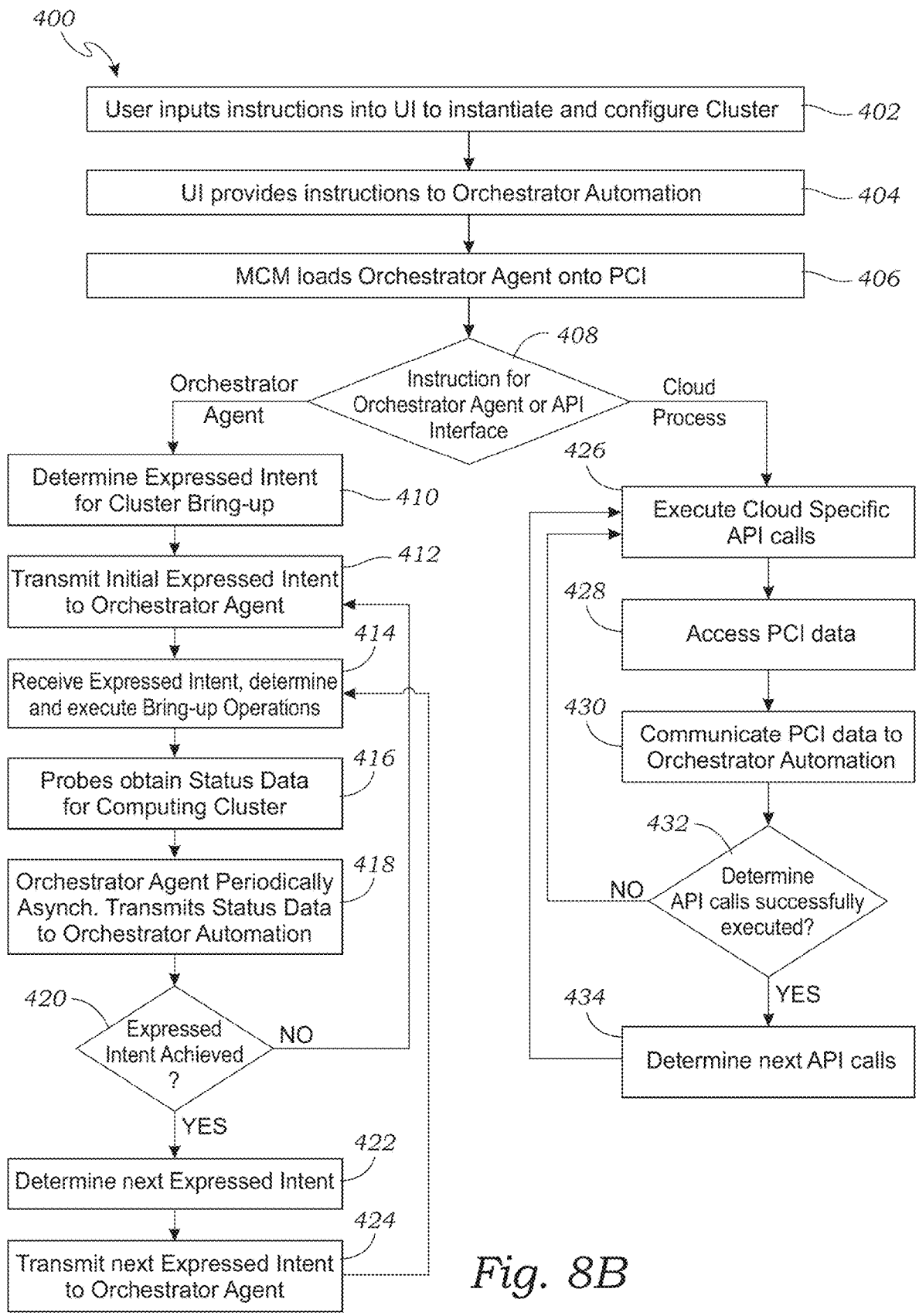
FIG. 8B is a flow chart of another method of using the techniques and systems illustrated in FIGS. 5-7 for bringing-up a computing cluster on a public cloud infrastructure, according to one embodiment.

Referring now to FIG. 8B, a more detailed method 400 for bringing-up a computing on a public cloud infrastructure 112a using the ping-pong communication protocol will now be described. The method 400 may include steps 202-208 of the method 200 described herein, in the case that the computing cluster 114 is being brought-up in a user's account on the public cloud infrastructure 112a. FIG. 7 and this description of the method 400 for bring-up of a computing cluster 114 will be directed to an embodiment in which the cluster 114 is brought-up in a user's account 116 on the public cloud infrastructure 112, with the understanding that other embodiments do not require such, as explained herein. At step 402, the user utilizes the user computing system 102 to input an intent-based instruction 306 into the UI 105 or UI 106 to instantiate a computing cluster 114 on the public cloud infrastructure 112a and configure the cluster 114 having a certain set of specifications. Step 402 is the same or similar to step 210 of method 200.

At step 404, the UI 105 or UI 106 provides the intent-based instruction 306 to the orchestrator 110, more specifically to the orchestrator automation 109. Step 404 is same or similar to step 212 of method 200. At step 406, the MCM 304 loads the orchestrator agent 111 onto the public cloud infrastructure 112a in the user's account 116 within the MCM virtualization environment 118. For example, the MCM 304 provisions a node on the public cloud infrastructure 112a in the user's account and loads the orchestrator agent 111 onto the node. Step 406 may be performed at any suitable point in the method 400 prior to the orchestrator automation 109 transmitting an initial expressed-intent 326a to the orchestrator agent 111 at step 412.

At step 408, the orchestrator automation module 109 receives the intent-based instruction 306 from the user computing system 102 (via the UI 105 or UI 106), and determines whether the intent-based instruction 306 is for processing by the orchestrator agent 111 (i.e., a tenant cluster process) or for processing by the API interface 314 of the public cloud infrastructure 112a (i.e., a public cloud process 306b in FIGS. 5 and 6). When the orchestrator automation module 109 determines that the intent-based instruction 306 is for processing by the orchestrator agent 111, at step 410, the orchestrator automation module 109 determines an initial expressed-intent 326a for bringing-up the computing cluster 114 on the public cloud infrastructure 112. This initiates the processing of the expressed-intent 306, in conjunction with the orchestrator agent 111, using the ping-pong communication protocol 312 (see FIGS. 5 and 6).

At step 412, the orchestration automation module 109 transmits an initial expressed-intent 326a to the orchestrator agent 111 loaded onto the public cloud infrastructure 112a. At step 414, the orchestrator agent 111 receives the initial expressed-intent 326a and determines and executes cluster bring-up operations on the public cloud infrastructure 112a based on the initial expressed-intent 326a. At step 416, the orchestrator agent 111 uses the probes 320 to obtain first status data 318 regarding the status of the computing cluster 114 being brought-up. At step 416, the probes 320 access metadata 322 corresponding to the configuration status of the computing cluster 114 from the metadata store 324. At step 418, the orchestrator agent 111 periodically and asynchronously transmits a "ping" comprising the first status data 318 to the orchestrator automation module 109, called a "ping."

At step 420, the orchestrator automation module 109 determines whether the expressed intent 326a has been successfully achieved. When the expressed intent 326a has not been successfully achieved, the method 400 returns to step 412 and the orchestrator automation module 109 transmits a "pong" to the orchestrator agent 111 in direct response to the "ping,' comprising a re-transmission of the expressed intent 326a.

When at step 420 the orchestrator automation module 109 determines that the current expressed intent 326a has been successfully achieved, at step 422, the orchestrator automation module 109 determines a next expressed-intent 326b based upon the first status data 318, and/or API status communications 314. At step 424, the orchestrator automation module 109 transmits the next-expressed intent 326b to the orchestrator agent 111.

When, at step 408, the orchestrator automation module 109 determines that the intent-based instruction 306 is a public cloud process 306b for processing by the API interface 314 of the public cloud infrastructure, at step 426, the cloud management system 304 executes cloud specific API calls 130 using remote API execution module 126 which are then processed by the API interface 314 of the public cloud infrastructure 112. The API calls 130 are processed using an API status communications protocol 314. At step 428, the API interface 314 accesses public cloud infrastructure data 316 from the PCI infrastructure metadata store. At step 430, the API interface 314 communicates the public cloud infrastructure data 316 (also referred to herein as "second status data 316") to the orchestrator automation 109. At step 432, the orchestrator automation 109 determines whether the API calls 130 have been successfully executed by the public cloud infrastructure 112 based on the second status data 316. When the orchestrator automation 109 determines that the API calls were not successfully executed, the process may return to step 426 and repeat the current API calls 130. When the orchestrator automation 109 determines that the API calls were successfully executed, at step 434, the orchestrator automation 109 determines additional API calls 130 based on the second status data 316 and the intent-based instruction(s) and/or specification(s) 306.

Steps 410-424 are repeated until the computing cluster 114 is successfully brought-up according to all of the instructions and specifications 306, or the process times out or is stopped by the user or some other process.

Accordingly, the system 300 and method 400 overcome the drawbacks of prior systems and method of bringing-up a computing cluster on a public cloud infrastructure. For instance, the ping-pong communication protocol provide more reliable communication between the cloud management system and improved fault tolerance.

The system 300 includes one or more software applications stored on one or more storage devices comprising computer readable medium. The system 300 also includes one or more processors configured to execute the instructions stored on the computer readable medium. The software application(s) stored on the computer readable medium and processors may be disposed on or in any of the systems of the system 100, including the user computing system 102, the multicloud management system 304, etc. Such software applications on computer readable medium and processors may be integrated into suitable computers, such computer servers, personal computers, etc. The software application(s) and processor(s) are configured to program the system 300 to perform the method embodiments as described herein.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for bringing-up a computing cluster on a public cloud infrastructure, comprising:
    transmitting, to a public cloud infrastructure selected from among a plurality of public cloud infrastructures, an intent-based instruction codifying an expressed intent for bringing-up a computing cluster on the public cloud infrastructure, wherein
    the expressed intent comprises a high level description of a configuration for the computing cluster; and
    bringing up the computing cluster at least by dispatching a bring-up operation to the public cloud infrastructure responsive to an electronic message from the public cloud infrastructure, wherein
    receipt of the electronic message invokes execution of a bring-up protocol corresponding to the public cloud infrastructure to bring up the computing cluster.

2. The method of claim 1, further comprising:
    receiving, at a multi-cloud management system from the public cloud infrastructure, one or more electronic messages including the electronic message, wherein the one or more electronic messages respectively comprise one or more corresponding current states of the computing cluster to be brought-up; and
    processing the intent-based instruction against the one or more electronic messages, wherein the expressed intent codified in the intent-based instruction is checked against the one or more corresponding current states of the computing cluster respectively codified in the one or more electronic messages.

3. The method of claim 2, wherein the public cloud infrastructure and a different public cloud infrastructure of the plurality of public cloud infrastructures are brought up with the multi-cloud management system using different bring-up protocols.

4. The method of claim 2, further comprising:
    responsive to receipt of the intent-based instruction, opening a communication port for communication between the public cloud infrastructure and the multi-cloud management system, wherein
    the one or more electronic messages are transmitted from the public cloud infrastructure but are not prompted by the multi-cloud management system, and the intent-based instruction does not include detailed bring-up commands.

5. The method of claim 1, further comprising:
transmitting, to the public cloud infrastructure, a first intent-based instruction codifying a first expressed intent; and
repeatedly transmitting, to the public cloud infrastructure, a next intent-based instruction upon a second determination that the first expressed intent codified in the first intent-based instruction is achieved based at least in part upon a stop criterion, wherein
the first expressed intent is different from the next expressed intent.

6. The method of claim 5, further comprising:
re-transmitting, to the public cloud infrastructure, the first intent-based instruction in response to a first electronic message from the public cloud infrastructure, upon a first determination that the first expressed intent codified in the first intent-based instruction is not achieved, wherein
the intent-based instruction comprises a public-cloud process that is executed by an application programming interface (API) of the public cloud infrastructure.

7. The method of claim 1, wherein the intent-based instruction is transmitted to the public cloud infrastructure in response to the electronic message received from the public cloud infrastructure, and the intent-based instruction includes a high-level description, rather than detailed instructions, for the computing cluster to be brought up.

8. The method of claim 1, wherein intent-based instructions including the intent-based instruction are respectively transmitted to the plurality of public cloud infrastructures via a single common interface of a single common management service, rather than via multiple, respective interfaces, and each public cloud infrastructure utilizes a different protocol.

9. A system, comprising:
a processor;
a memory for holding programmable code; and
wherein the programmable code includes instructions executable by the processor for
transmitting, to a public cloud infrastructure selected from among a plurality of public cloud infrastructures, an intent-based instruction codifying an expressed intent for bringing-up a computing cluster on the public cloud infrastructure, wherein
the expressed intent comprises a high level description of a configuration for the computing cluster; and
bringing up the computing cluster at least by dispatching a bring-up operation to the public cloud infrastructure responsive to an electronic message from the public cloud infrastructure, wherein
receipt of the electronic message invokes execution of a bring-up protocol corresponding to the public cloud infrastructure to bring up the computing cluster.

10. The system of claim 9, the programmable code further including the instructions executable by the processor for:
receiving, at a multi-cloud management system from the public cloud infrastructure, one or more electronic messages including the electronic message, wherein the one or more electronic messages respectively comprise one or more corresponding current states of the computing cluster to be brought-up; and
processing the intent-based instruction against the one or more electronic messages, wherein the expressed intent codified in the intent-based instruction is checked against the one or more corresponding current states of the computing cluster respectively codified in the one or more electronic messages.

11. The system of claim 10, wherein the public cloud infrastructure and a different public cloud infrastructure of the plurality of public cloud infrastructures are brought up with the multi-cloud management system using different bring-up protocols.

12. The system of claim 10, the programmable code further including the instructions executable by the processor for:
responsive to receipt of the intent-based instruction, opening a communication port for communication between the public cloud infrastructure and the multi-cloud management system, wherein
the one or more electronic messages are transmitted from the public cloud infrastructure but are not prompted by the multi-cloud management system, and
the intent-based instruction does not include detailed bring-up commands.

13. The system of claim 9, the programmable code further including the instructions executable by the processor for:
transmitting, to the public cloud infrastructure, a first intent-based instruction codifying a first expressed intent; and
repeatedly transmitting, to the public cloud infrastructure, a next intent-based instruction upon a second determination that the first expressed intent codified in the first intent-based instruction is achieved based at least in part upon a stop criterion, wherein
the first expressed intent is different from a next expressed intent.

14. The system of claim 10, the programmable code further including the instructions executable by the processor for:
re-transmitting, to the public cloud infrastructure, the first intent-based instruction in response to a first electronic message from the public cloud infrastructure, upon a first determination that the first expressed intent codified in the first intent-based instruction is not achieved, wherein
the intent-based instruction comprises a public-cloud process that is executed by an application programming interface (API) of the public cloud infrastructure.

15. A computer program product embodied on a non-transitory computer readable medium, the non-transitory computer readable medium having stored thereon a sequence of instructions which, when executed by a processor, executes at least:
transmitting, to a public cloud infrastructure selected from among a plurality of public cloud infrastructures, an intent-based instruction codifying an expressed intent for bringing-up a computing cluster on the public cloud infrastructure, wherein the expressed intent comprises a high level description of a desired configuration for the computing cluster; and
bringing up the computing cluster at least by dispatching a bring-up operation to the public cloud infrastructure responsive to an electronic message from the public cloud infrastructure, wherein
receipt of the electronic message invokes execution of a bring-up protocol corresponding to the public cloud infrastructure to bring up the computing cluster.

16. The computer program product of claim 15, wherein the computer readable medium having stored thereon the sequence of instructions which, when executed by the processor, further executes at least:

receiving, at a multi-cloud management system from the public cloud infrastructure, one or more electronic messages including the electronic message, wherein the one or more electronic messages respectively comprise one or more corresponding current states of the computing cluster to be brought-up; and processing the intent-based instruction against the one or more electronic messages, wherein the expressed intent codified in the intent-based instruction is checked against the one or more corresponding current states of the computing cluster respectively codified in the one or more electronic messages.

17. The computer program product of claim 16, wherein the public cloud infrastructure and a different public cloud infrastructure of the plurality of public cloud infrastructures are brought up with the multi-cloud management system using different bring-up protocols.

18. The computer program product of claim 16, wherein an agent performs a task and generates a task result that is provided to a sub-scheduler, a meta-scheduler, or a cluster manager.

19. The computer program product of claim 15, wherein the computer readable medium having stored thereon the sequence of instructions which, when executed by the processor, further executes at least:

transmitting, to the public cloud infrastructure, a first intent-based instruction codifying a first expressed intent; and repeatedly transmitting, to the public cloud infrastructure, a next intent-based instruction upon a second determination that the first expressed intent codified in the first intent-based instruction is achieved based at least in part upon a stop criterion, wherein the first expressed intent is different from the next expressed intent.

20. The computer program product of claim 15, wherein the computer readable medium having stored thereon the sequence of instructions which, when executed by the processor, further executes at least:

re-transmitting, to the public cloud infrastructure, the first intent-based instruction in response to a first electronic message from the public cloud infrastructure, upon a first determination that the first expressed intent codified in the first intent-based instruction is not achieved, wherein the intent-based instruction comprises a public-cloud process that is executed by an application programming interface (API) of the public cloud infrastructure.

* * * * *